(12) United States Patent
Murabayashi

(10) Patent No.: US 8,009,232 B2
(45) Date of Patent: Aug. 30, 2011

(54) DISPLAY CONTROL DEVICE, AND ASSOCIATED METHOD OF IDENTIFYING CONTENT

(75) Inventor: Noboru Murabayashi, Saitama (JP)

(73) Assignee: Sony Corporation, Tokyo (JP)

( * ) Notice: Subject to any disclaimer, the term of this patent is extended or adjusted under 35 U.S.C. 154(b) by 1297 days.

(21) Appl. No.: 11/546,987

(22) Filed: Oct. 13, 2006

(65) Prior Publication Data

US 2007/0094602 A1   Apr. 26, 2007

(30) Foreign Application Priority Data

Oct. 25, 2005 (JP) ................. 2005-309336

(51) Int. Cl.
*H04N 5/46* (2006.01)
*H04N 5/76* (2006.01)

(52) U.S. Cl. ...................................... 348/558; 386/241

(58) Field of Classification Search .......... 348/559, 348/558, 560, 563, 725; 725/32–36, 40–44, 725/59; 386/1, 46, 68–70, 83
See application file for complete search history.

(56) References Cited

U.S. PATENT DOCUMENTS

| | | | | |
|---|---|---|---|---|
| 6,778,223 B2 * | 8/2004 | Abe | ............... | 348/559 |
| 7,013,477 B2 * | 3/2006 | Nakamura et al. | ............... | 725/32 |
| 7,149,411 B2 * | 12/2006 | Jun et al. | ........................... | 386/70 |
| 7,185,283 B1 * | 2/2007 | Takahashi | ..................... | 715/723 |
| 7,193,645 B1 * | 3/2007 | Aagaard et al. | ............. | 348/211.3 |
| 7,346,264 B2 * | 3/2008 | Jun et al. | ........................... | 386/68 |
| 7,606,462 B2 * | 10/2009 | Hosoda et al. | ................ | 386/241 |
| 2001/0053277 A1 * | 12/2001 | Jun et al. | ........................... | 386/70 |
| 2002/0190991 A1 * | 12/2002 | Efran et al. | .................... | 345/475 |
| 2003/0123850 A1 * | 7/2003 | Jun et al. | ........................... | 386/68 |
| 2004/0056879 A1 * | 3/2004 | Erdelyi | ........................ | 345/716 |

FOREIGN PATENT DOCUMENTS

| | | |
|---|---|---|
| EP | 1 081 960 A1 | 3/2001 |
| EP | 1 164 791 A1 | 12/2001 |
| EP | 1 278 134 A2 | 1/2003 |
| JP | 7-46517 | 2/1995 |
| JP | 10-200814 | 7/1998 |
| JP | 11-284948 | 10/1999 |
| JP | 2002-27410 | 1/2002 |
| JP | 2003-134415 | 5/2003 |
| JP | 2003-242164 | 8/2003 |
| JP | 2004-72727 | 3/2004 |
| JP | 2004-166131 | 6/2004 |
| JP | 2005-33714 | 2/2005 |

* cited by examiner

*Primary Examiner* — Paulos M Natnael
(74) *Attorney, Agent, or Firm* — Oblon, Spivak, McClelland, Maier & Neustadt, L.L.P.

(57) ABSTRACT

A display control device is provided for specifying a notable scene in content based on characteristic data included in one of video data and audio data of the content to be reproduced. A predetermined scene in the content is detected, based on an evaluation value, and a related image is displayed, in response to the detection of the notable scene in the content. A related image with a predetermined size based on an image of the notable scene may be presented to a display.

17 Claims, 18 Drawing Sheets

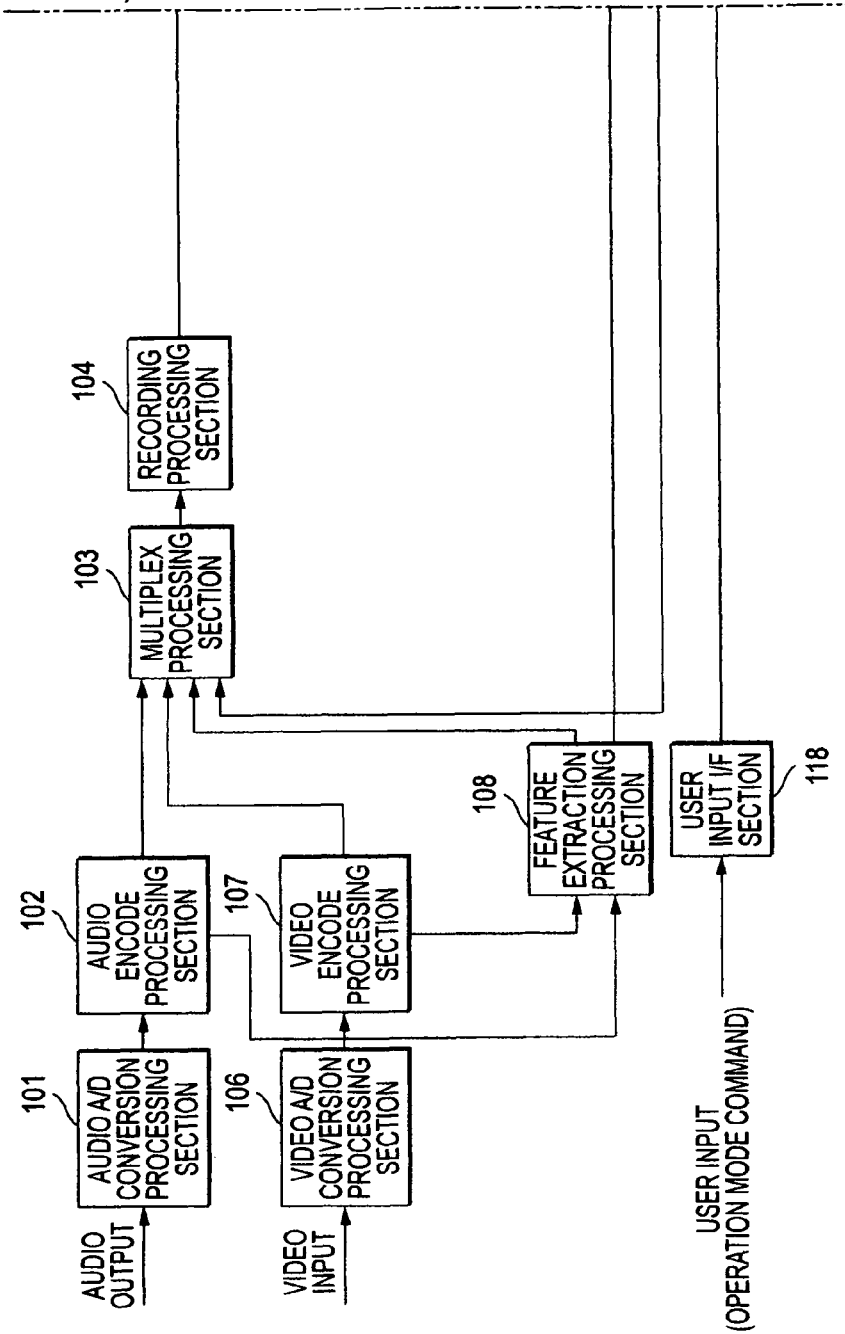

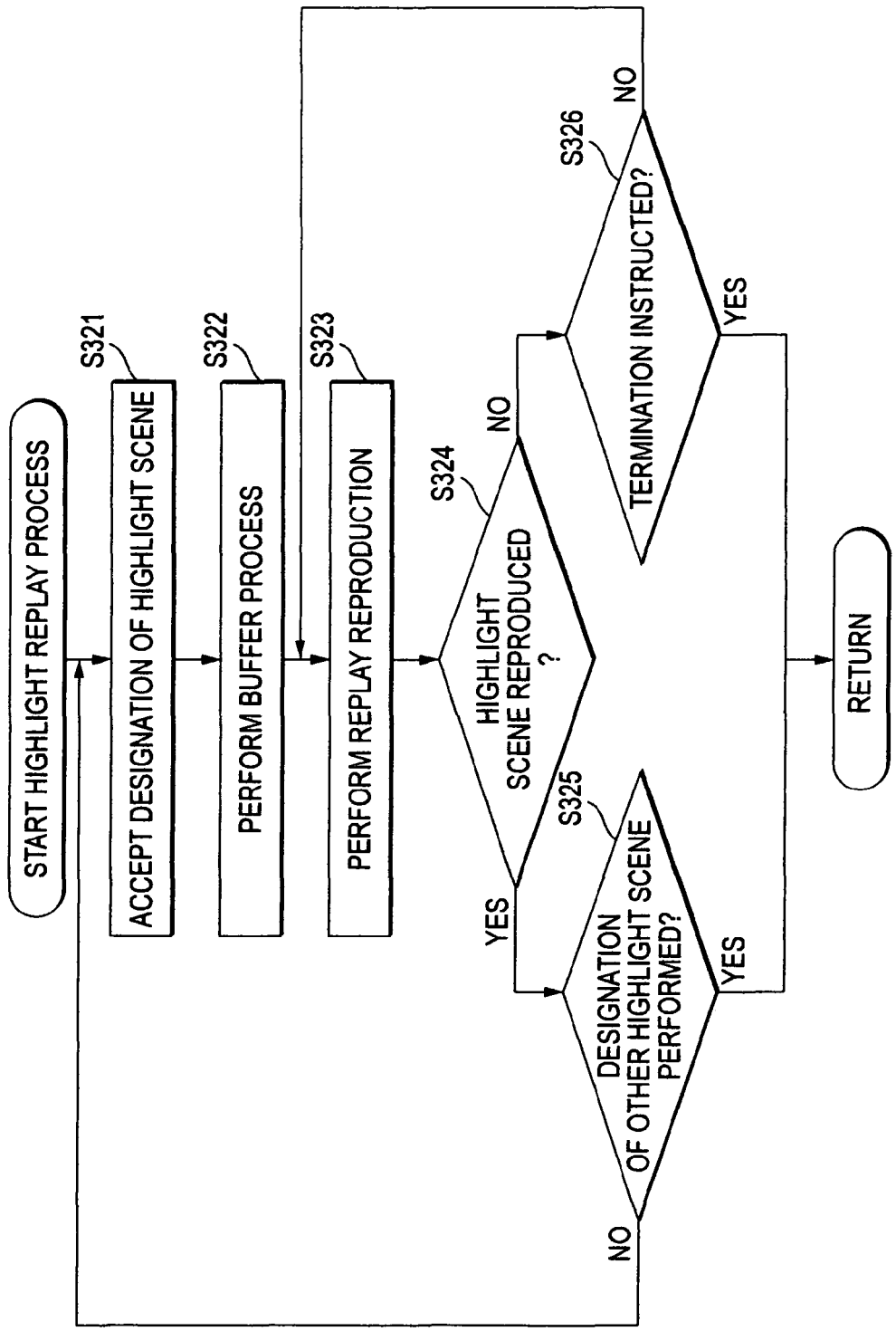

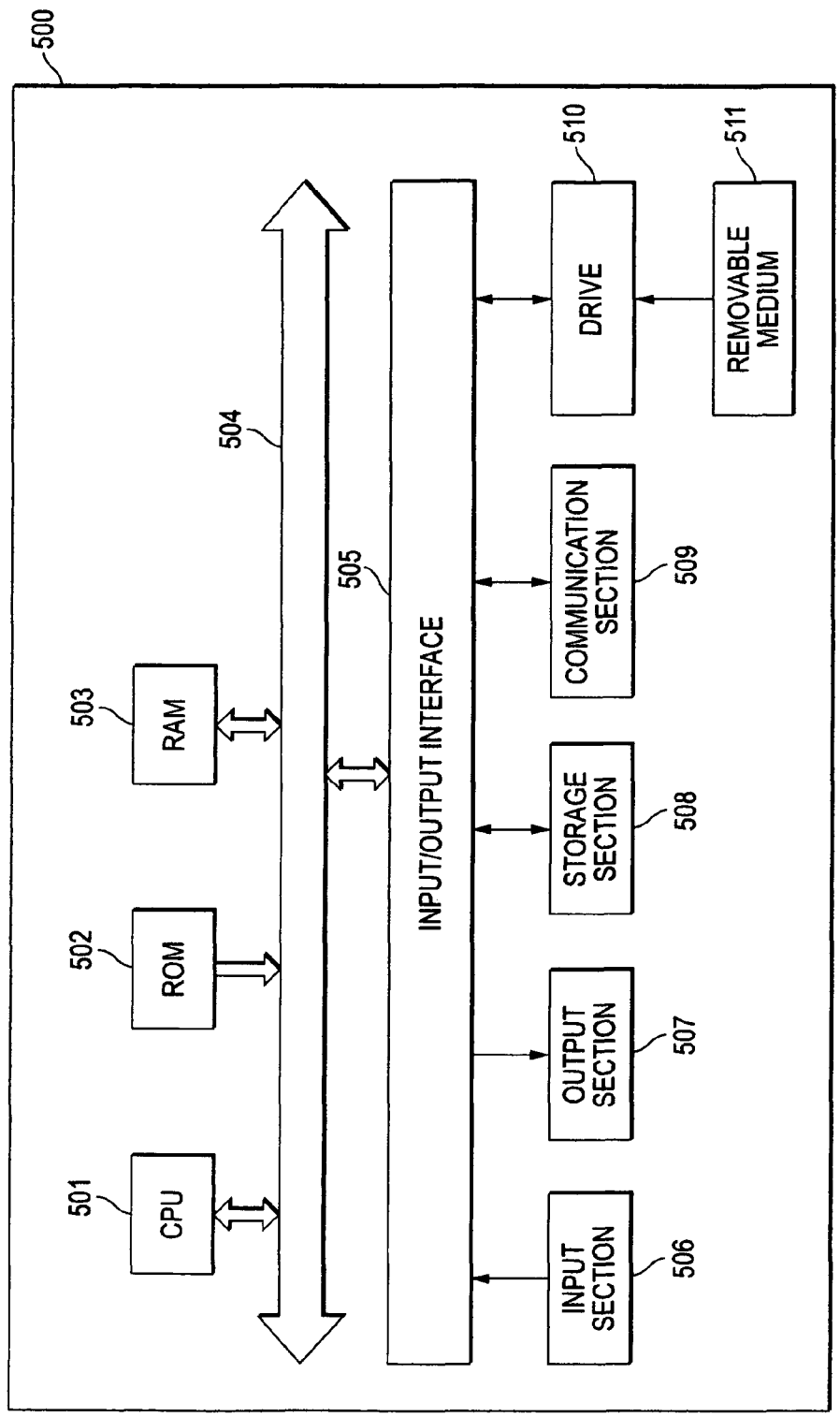

DISPLAY CONTROL DEVICE, AND ASSOCIATED METHOD OF IDENTIFYING CONTENT

BACKGROUND OF THE INVENTION

The present invention relates to a display control device and associated display control method for efficiently offering a user a notable video picture.

The "background" description provided herein is for the purpose of generally presenting the context of the invention. Work of the presently named inventors, to the extent it is described in this background section, as well as aspects of the description which may not otherwise qualify as prior art at the time of filing, are neither expressly or impliedly admitted as prior art against the present invention.

In recent years, video recording/reproduction devices have detected a scene including a notable video picture using characteristic data relating to an image or a sound compressing process, such as a motion vector or a DCT coefficient. Thus, for example, digest play can be performed (see for example JP-A-2005-33714) by extracting predetermined characteristic data from recorded image/sound data and then selectively playing a predetermined characteristic interval according to a predetermined rule.

Further, it is possible that, for example, the most exciting scene (e.g., a goal scene in a soccer game) and so on are detected in accordance with characteristic data of video pictures or sounds of a live sports broadcast to be offered to the user.

However, there may be a number of desirable scenes (highlight scenes) in a live sports broadcast. Although it becomes possible to allow the user to identify the portion of the game in the live sports broadcast quickly by displaying such highlight scenes one after another, in the case of, for example, a soccer game, play before the goal such as a pass or dribbling prior to the goal is extremely important. Namely, even if the highlight scenes are displayed one after another, the user cannot perceive the lead in action to the highlight scenes, and accordingly the highlights are less informative and enjoyable.

The present invention is provided in view of the above, and enables a more enjoyable and informative content segment.

SUMMARY OF THE INVENTION

A display control device according to an embodiment of the invention includes a reproduction section reproducing content, an evaluation value operation section operating evaluation value for specifying a notable scene in the content, based on characteristic data included in one of video data and audio data of the content to be reproduced by the reproduction section, and for detecting a predetermined scene in the content, a scene detection judgment section judging whether or not the notable scene in the content has been detected, based on the evaluation value operated by the evaluation value operation section, and a related image display control section displaying, in response to the judgment of detection of the notable scene in the content by the scene detection judgment section, a related image with a predetermined size based on an image of the notable scene thus detected.

The video picture of the content, which is presently under reproduction, can further be displayed together with the related image.

The display control device can further include a holding section holding the video data of the content to be reproduced by the reproduction section, and the related image display control section can generate the related image by generating a still image based on the video data of the notable scene, the video data being held by the holding section.

Further, it can be arranged that video data of a predetermined period of time immediately before the notable scene corresponding to selected one of the related images is reproduced more than once.

It can also be arranged that the related image is generated based on the video data, held by the holding section, and reproduced previously to the detected notable scene.

Further, it can be arranged that the related image is obtained by generating a still image from a video picture reproduced at a previously designated time point, the video picture being included in the video data of a predetermined period of time to be reproduced previously to the notable scene.

It can also be arranged that the related image is obtained by generating a still image from a video picture reproduced at a time point when the evaluation value operated by the evaluation value operation section satisfies a previously designated criteria, the video picture being included in the video data of a predetermined period of time to be reproduced previously to the notable scene.

A display control method according to another embodiment of the invention includes the step of reproducing content, the step of operating evaluation value for specifying a notable scene in the content, based on characteristic data included in one of video data and audio data of the content to be reproduced, and for detecting a predetermined scene in the content, the step of judging whether or not the notable scene in the content has been detected, based on the operated evaluation value, and the step of controlling, in response to the judgment of detection of the notable scene in the content, to display a related image with a predetermined size based on an image of the notable scene thus detected.

A computer readable program according to still another embodiment of the invention includes the step of controlling to reproduce content, the step of controlling to operate evaluation value for specifying a notable scene in the content, based on characteristic data included in one of video data and audio data of the content, and for detecting a predetermined scene in the content, the step of controlling to judge whether or not the notable scene in the content has been detected, based on the operated evaluation value, and the step of controlling, in response to the judgment of detection of the notable scene in the content, to display a related image with a predetermined size based on an image of the notable scene thus detected.

According to an embodiment of the invention, the content is reproduced, evaluation value for specifying a notable scene in the content is operated, based on characteristic data included in one of video data and audio data of the content to be reproduced, and for detecting a predetermined scene in the content, whether or not the notable scene in the content has been detected is judged based on the operated evaluation value, and in response to the judgment of detection of the notable scene in the content, display of a related image with a predetermined size based on an image of the notable scene thus detected is controlled.

According to the embodiment of the invention, a notable video picture can efficiently be offered to the user, and a video picture enjoyable for the user can preferably be offered to the user.

It is to be understood that both the foregoing general description of the invention and the following detailed description are exemplary, but are not restrictive, of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein:

FIG. 16 is a flowchart of a highlight replay process in accordance with an exemplary embodiment of the inventions; and FIG. 17 is a high level block diagram of a computing device.

DETAILED DESCRIPTION OF THE PREFERRED EMBODIMENTS

Figure 1:
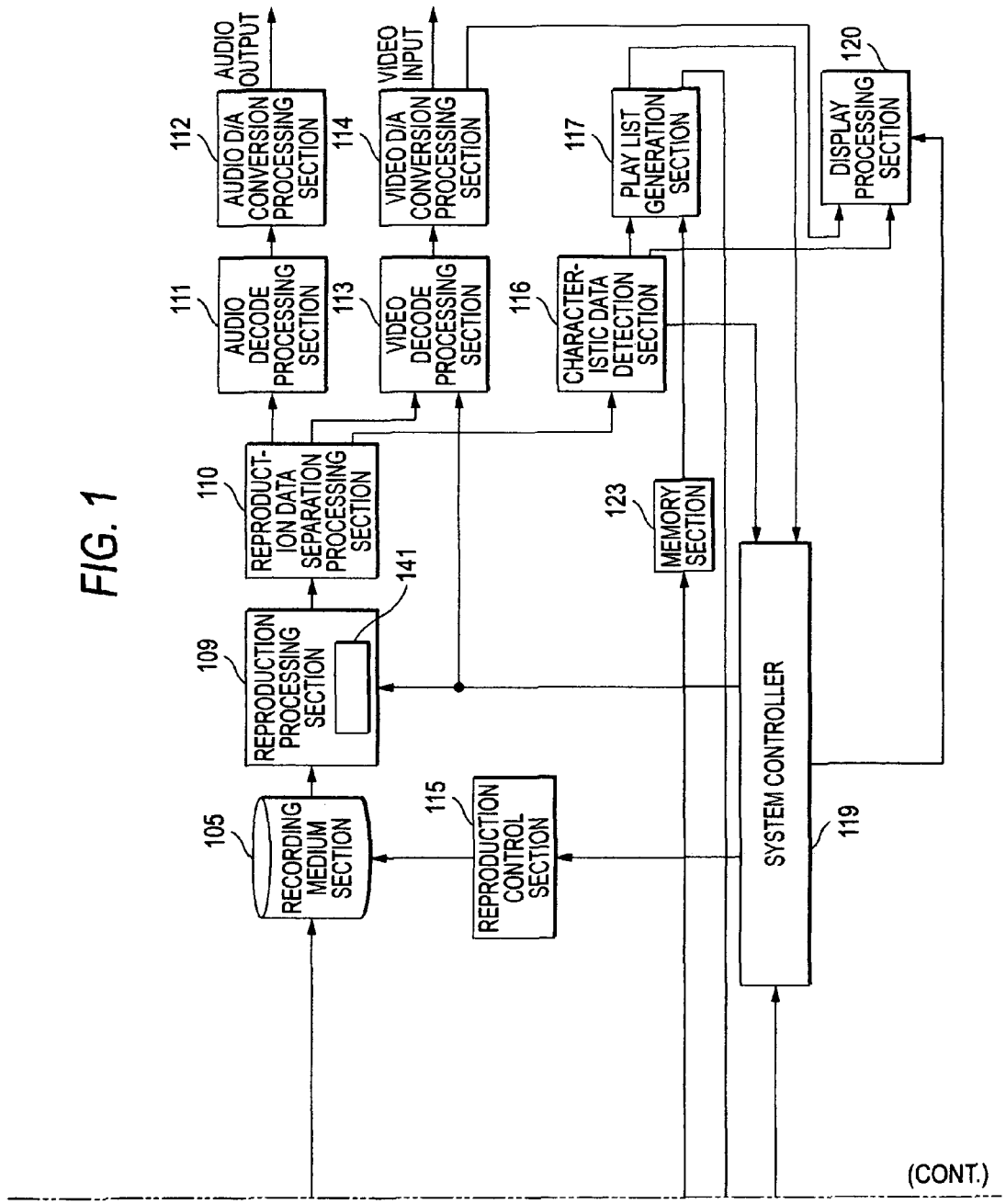
FIG. 1 is a high level block diagram showing an exemplary embodiment of a recording/reproducing device according to the inventions described herein.

In the figures, the same reference numerals are used for designating the same elements throughout the several figures.

A display control device of an exemplary embodiment of the inventions is provided with a reproduction processing system 109 as shown in FIG. 1) for reproducing content. A system controller 119 is shown in FIG. 1 is provided for performing a process of the step S105 shown in FIG. 5) for operating an evaluation value for specifying a notable scene in the content in accordance with a characteristic data included in video data or audio data of the content reproduced by the reproduction processing system and for detecting a predetermined scene in the content. (performing a process of the step S106 shown in FIG. 5) The detection judgment determines whether or not the notable scene is detected in the content based on the evaluation value of the system controller 119, and related image display control (performing a process of the step S107 shown in FIG. 5) for displaying a related image with a predetermined size in accordance with an image of the notable scene in response to the scene detection judgment which judges that the notable scene is detected in the content.

The display control device can further be provided with a buffer memory 141 shown in FIG. 1 for storing the video data of the content reproduced by the reproduction processing system 109 and the related image display control of system controller 119 can be arranged to generate the related image by generating a still image based on the video data of the notable scene, which is the video data held in the memory 141.

Figure 5:
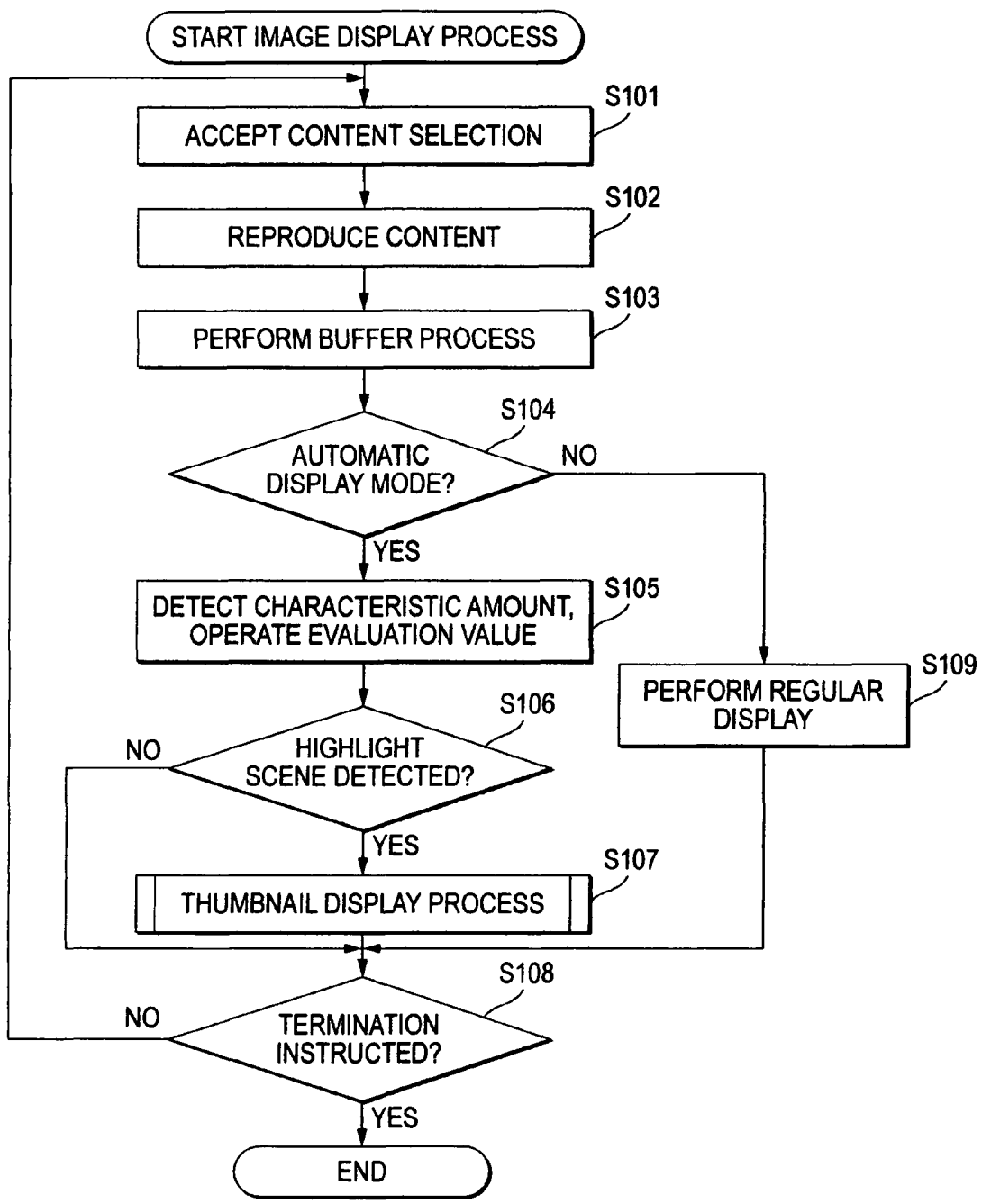
FIG. 5 is a flowchart of an image display process in accordance with an exemplary embodiment of the inventions.

A display control method of an exemplary embodiment of the inventions includes the steps of reproducing the content (e.g., the process of the step S102 shown in FIG. 5), operating the evaluation value for specifying the notable scene in the content in accordance with the characteristic data included in the video data or the audio data of the content thus reproduced and for detecting a predetermined scene in the content (a process of the step S105 shown in FIG. 5), judging whether or not the notable scene is detected in the content based on the evaluation value thus operated (e.g., a process of the step S106 shown in FIG. 5), controlling display of the related image with a predetermined size based on the image of the notable scene in response to the judgment that the notable scene is detected in the content (e.g., a process of the step S107 shown in FIG. 5).

Hereinafter, embodiments of the present inventions will be described with reference to the accompanying drawings.

FIG. 1 is a block diagram showing a configuration example of an embodiment of a recording/reproducing device 100 applying the inventions. The recording/reproducing device 100 is provided with an audio A/D conversion processing section 101 for inputting audio data and converting it into a digital signal. An audio encode processing section 102 is provided for receiving the digital signal of the audio converted by the audio A/D conversion processing section 101 and encoding it. An image A/D conversion processing section 106 is provided for receiving video data and converting it into a digital signal. An video encode processing section 107 is provided for receiving the digital signal of the video picture converted by the image A/D conversion processing section 106 and encoding it.

The audio signal of the audio encode processing section 102, the video signal of the video encode processing section 107, and characteristic audio and video signals are multiplexed by a multiplex processing section 103, and a recording processing section 104 controls the multiplexed audio/video signal for recording in a recording medium section 105.

Further, the recording/reproducing device 100 is provided with a feature extraction processing section 108 for extracting a characteristic part used in detecting an important scene such as a highlight scene in the digital signals obtained by the audio encode processing section 102 and the video encode processing section 107.

Further, the recording/reproducing device 100 is provided with a reproduction processing section 109 for reproducing the data recorded in the recording medium section 105. A reproduction data separation processing section 110 separates the audio data and the video data reproduced by the reproduction processing section 109. An audio decode processing section 111 decodes the separated audio data. An audio D/A conversion processing section 112 converts the decoded audio data into an analog signal and outputs it therefrom. A video decode processing section 113 decodes the video data separated by the reproduction data separation processing section 110. A video D/A conversion processing section 114 converts the decoded video data into an analog signal and outputs it therefrom. The reproduction processing section 109 includes a buffer memory 141 to store a predetermined amount of video data to be reproduced. Further, the video decode processing section 113 generates one or more thumbnail images described below, which is an image generated in accordance with the video picture to be reproduced.

The thumbnail image can also be generated in the case in which the content image data is encoded in accordance with a Moving Picture Experts Group standard. For example, by performing a reducing signal processing with a predetermined size on the decoded base band image data besides the generation from the DC coefficient data of the predetermined DCT. In other words, assuming that the size of the original image is 720 pixels in the horizontal direction and 480 pixels in the vertical direction, the thumbnail image with a predetermined size can be generated by the signal processing of drawing an image only with the DC coefficient data.

For example, assuming that the image data is in the MPEG 4:2:0 format, the macro block is composed of 16×16 pixels, the Y (brightness) signal is composed of four blocks, and the chromatic signals Cb, Cr are each composed of one block. Accordingly, based on the average data of the four blocks of the Y signal and the DC coefficient data of the one block of each of the Cb and Cr signals, the thumbnail image with a block composed of 8×8 pixels and of 1/64 size, namely the thumbnail image composed of 90×60 pixels can be generated from the macro block.

Further, if the image data of the thumbnail of 1/64 size is required to be generated from the base band image data, it is possible to perform the eight data averaging signal processing in the horizontal direction, and then perform the eight data averaging signal processing in the vertical direction.

According to the predetermined data processing described above, an amount of data in the horizontal direction becomes 720/8=90 pixels, and an amount of data in the vertical direction becomes 480/8=60 pixels, thus the thumbnail image of 90×60 size can be generated. It should be noted that the size of the thumbnail image is not limited to the size described above, but it is possible to generate images with other sizes by a process such as changing the amount of data used for the averaging process.

Since the thumbnail image generated by such a predetermined generation method uses a smaller area in the screen compared to the original image of a normal size, it is conceivable that the image quality is not a matter of concern. However, in some situations, it can be considered to perform signal processing such as improvement of the contrast or the outline (edge) as another processing than the signal processing only with the averaging described above.

Although the generation of the compressed image is described here as the image (related image) generated in accordance with the video picture to be reproduced, the image is not limited to one processed with the compressed signal processing, but can be generated as an image processed with an enlarged signal processing or an image of the same size.

Further, the recording/reproducing device 100 is provided with a reproduction control section 115 for controlling reproduction of the recording medium 105 in accordance with an instruction from the system controller 119, a characteristic data detection section 116 for detecting the characteristic data separated by the reproduction data separation section 110, a play list generating section 117 for generating a list of items to be reproduced according to needs, a user input I/F section 118 for receiving the user operation input, and a display processing section 120 for controlling display of the video picture on the display device. The system controller 119 is configured including a central processing unit (CPU), a random access memory (RAM), a read only memory (ROM), and so on, and operates in accordance with an instruction set of firmware of software such as a program to control every section configuring the recording/reproducing device 100.

In the recording/reproducing device 100, the audio signal is input to the audio A/D conversion processing section 101 to be processed with a predetermined A/D conversion process, and then input to the audio encode processing section 102 to be processed with a predetermined bandwidth compression signal process such as the MPEG audio or the AC3 audio. After then, the audio signal is further input to the multiplex processing section 103 to be processed with a predetermined multiplexing process.

The video signal is input to the video A/D conversion processing section 106 to be processed with a predetermined A/D conversion process, and then processed with a predetermined bandwidth compression signal process such as the MPEG in the video encode processing section 107. After then, the video signal is further input to the multiplex processing section 103 to be processed with a predetermined multiplexing process.

Further, in the feature extraction processing section 108, predetermined characteristic data is extracted from the audio data and the video data. The characteristic data is the data relating to the compressing process of an image or a sound such as the motion vector or the DCT coefficient, and is extracted for detecting a scene including a video picture satisfying predetermined conditions set previously.

The case in which the extraction of the characteristic data for detecting a predetermined scene is performed will be described herein. As an example, the MPEG is used as the bandwidth compression signal process, and the extraction process is performed using a signal of the signal processing procedure. For example, if a scene with telop (i.e., character data or symbol data) displayed therewith needs to be detected using the characteristic data, it can be arranged that the scene is detected using the AC coefficient of the DCT in a predetermined screen area in the MPEG video process as the characteristic data (telop characteristic data) for judging whether or not the telop is displayed on the screen because there are many features in the high frequency components focusing on the edges in the boundary of the telop.

Further, if a scene with a figure needs to be detected using the characteristic data, the process can be performed using the DC coefficient of the DCT of the chromatic signal as specific color characteristic data, and detection of the figure can also be performed with a measure of accuracy focusing on, for example, the flesh color of the figure.

Further, if a moving scene needs to be detected using the characteristic data, the detection can be performed using the motion vector in the MPEG video process, and an action such as a panning or a zooming movement of a camera can be recognized with a measure of accuracy.

Further, feature extraction based on the audio data is also possible. Regarding the audio characteristic data, it can be used for judging whether a certain interval is an interval in which audio data is detected or an interval with no audio data by performing a process for comparing detected power of the audio data in a predetermined interval with a predetermined threshold value. And further, since it has a characteristic that a speaker speech signal does not continue as long as, for example, a music signal because of intake of breath of the speaker, the attribute of the audio signal in the interval can also be judged with a measure of accuracy. Further, as other audio characteristic extraction processing methods, a method of performing the extraction process based on the characteristic of the peak detection data of the power spectrum of every predetermined interval using fast Fourier transformation (FFT) process and a method of performing the extraction process based on the variance characteristic of the average power of every predetermined interval are also possible.

The characteristic data as described above is detected and processed with a signal process by the feature extraction processing section 108, and then similarly input to the multiplex processing section 103, and recorded in the recording medium section 105 through the recording processing section 104.

Further, in the recording/reproducing device 100, the signal reproduced from the recording medium section 105 is processed with a predetermined reproduction signal process in the reproduction processing section 109 and then input to the reproduction data separation processing section 110.

The audio data is processed with a predetermined separation process, processed by the audio decode processing section 111 with a predetermined decode process, and then processed by the audio D/A processing section 112 with a predetermined D/A process to output the sounds.

The video data is processed with a predetermined separation process, processed by the video decode processing section 113 with a predetermined decode process, and then processed by the video D/A processing section 114 with a predetermined D/A process to output the video pictures.

The characteristic data is processed by the characteristic data detection section 116 with a predetermined detection process, and then input to the system controller 119.

A display example in the case in which a highlight scene is detected in the recording/reproducing device 100 will now be explained. The recording/reproducing device 100 displays the thumbnail image described above on a display screen such as a display device connected thereto according to needs.

Figure 2:
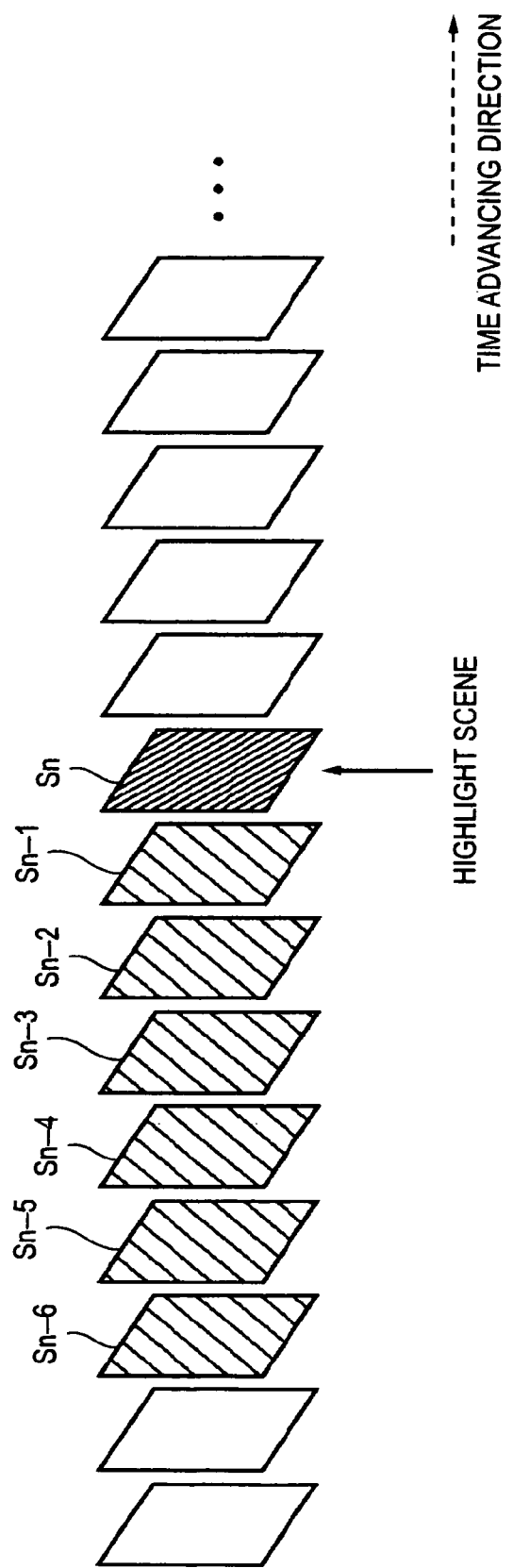
FIG. 2 is a content segment diagram showing an example of the case in which a frame Sn corresponding to a highlight scene is detected in accordance with an exemplary embodiment of the inventions.

FIG. 2 is a diagram showing an example of the case in which a frame Sn corresponding to a highlight scene is detected in a number of frames in video pictures to be recorded or reproduced in the recording/reproducing device 100, for example. In the drawing, it is assumed that time advances from the left to the right, and the video pictures respectively corresponding to the frames each expressed with a parallelogram in the drawing are reproduced sequentially.

Figure 3:
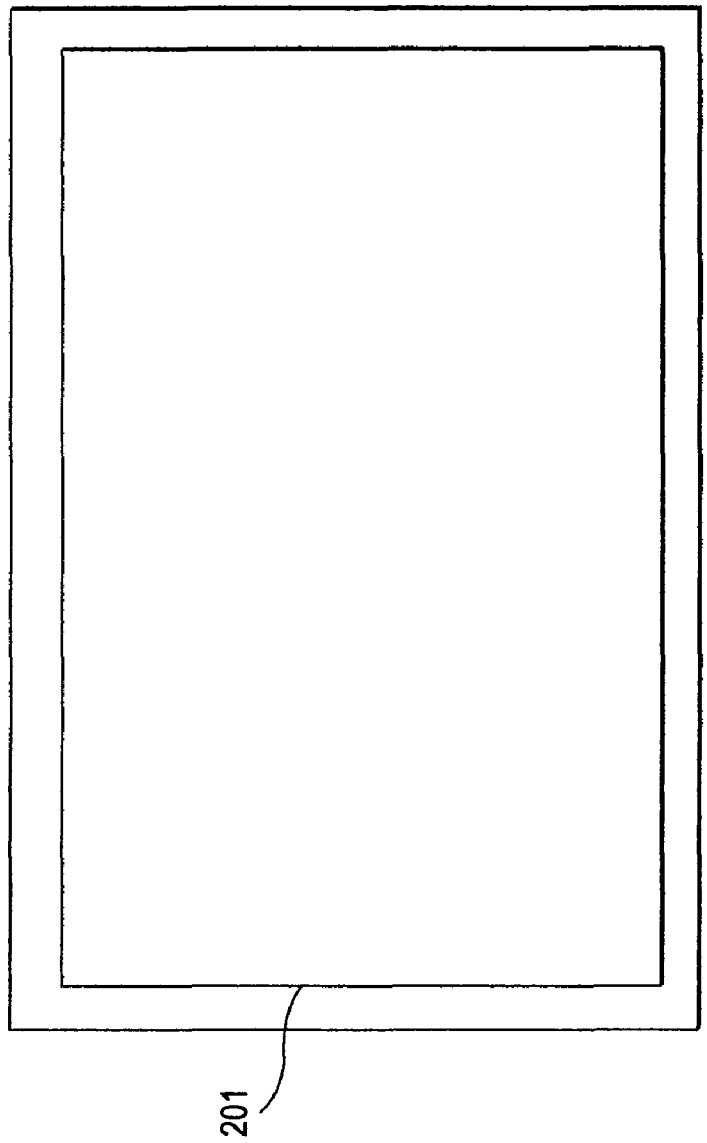
FIG. 3 is an exemplary display screen of a display device prior to the frame corresponding to the highlight scene in accordance with an exemplary embodiment of the inventions.

FIG. 3 is a diagram showing a display example of a display screen 201 such as a display device connected to the recording/reproducing device 100 prior to the frame Sn corresponding to the highlight scene is detected (reproduced), and the video picture presently recorded or reproduced is displayed on the entire display screen 201.

Figure 4:
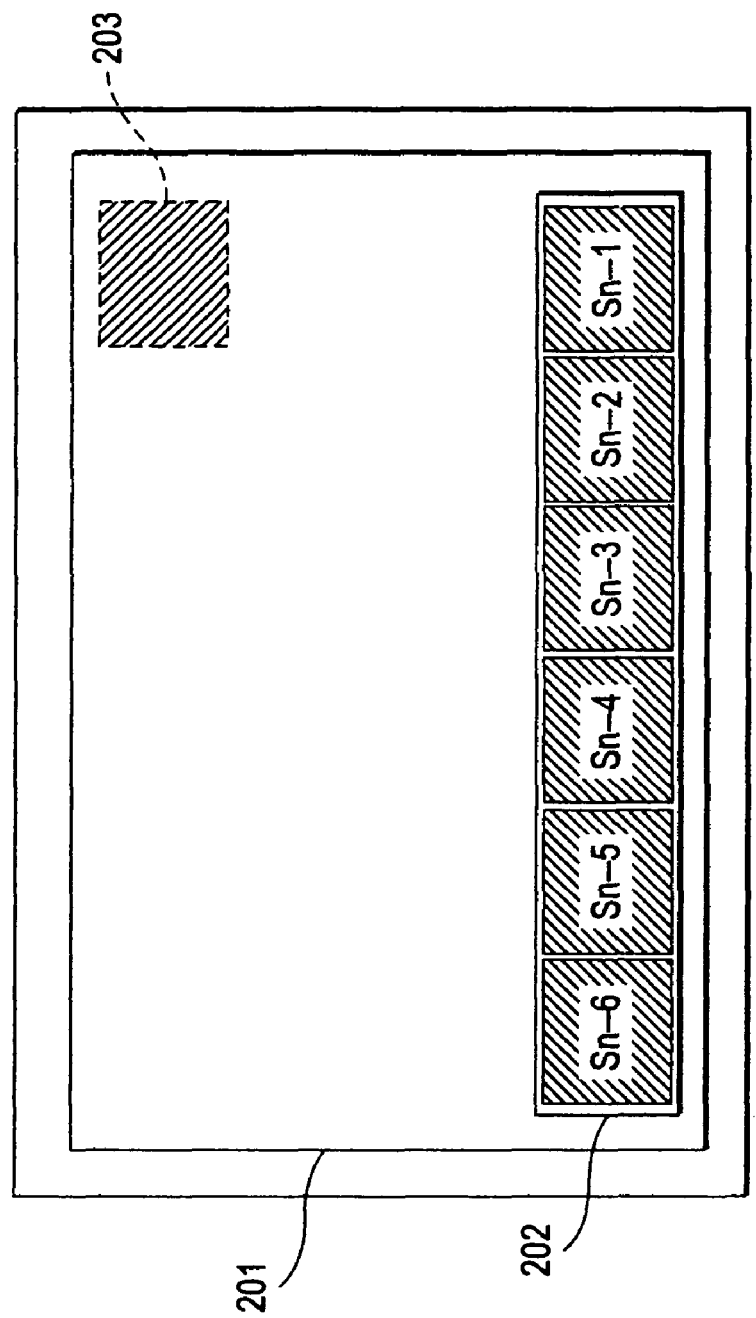
FIG. 4 is an exemplary display example of a display screen of a display device or the like after the frame corresponding to the highlight scene has been detected in accordance with an exemplary embodiment of the inventions.

FIG. 4 is a diagram showing a display example of a display screen 201 such as a display device connected to the recording/reproducing device 100 after the frame Sn corresponding to the highlight scene is detected (reproduced), and in this example, six thumbnail images are displayed in a lower area 202 of the display screen 201. In this case, the thumbnail images are images of a frame Sn-1 reproduced previously to the frame Sn corresponding to the highlight scene, a frame Sn-2 reproduced further previously to the frame Sn-1, . . . , and a frame Sn-6. And, the video picture, which is presently being reproduced, is displayed in the area of the display screen 201 except the area 202.

Further, it can be arranged that the video pictures for a predetermined period of time immediately before the highlight scene are displayed as a replay image in the area of the display screen 201 except the area 202.

It should be noted that whether or not the thumbnail images are displayed in response to detection of the highlight scene is judged by the mode previously set, and if the recording/reproducing device 100 is set to a mode for automatically displaying the thumbnail images, as shown in FIG. 4, the images of the frames Sn-1, Sn-2, . . . , and Sn-6 are displayed in the area 202 as the thumbnail images in response to detection of the frame Sn corresponding to the highlight scene.

Further, it can be arranged that the video picture, which is presently being reproduced, is displayed in the area 203 when the video pictures for a predetermined period of time immediately before the highlight scene are displayed as a replay image in the area of the display screen 201 except the area 202.

An image display process in the case in which the thumbnail images are displayed in response to detection of the highlight scene in the recording/reproducing device 100 as described above with reference to FIGS. 3 and 4 will now be explained with reference to a flowchart shown in FIG. 5. An example of the image display process in the case in which content recorded in the recording medium section 105 is reproduced, the highlight scene is detected in the video pictures of the reproduced content, and then the thumbnail images are displayed will hereinafter be described.

Any processes descriptions or blocks in flow charts should be understood as representing modules, segments, portions of code which include one or more executable instructions for implementing specific logical functions or steps in the process, and alternate implementations are included within the scope of the exemplary embodiment of the present invention in which functions may be executed out of order from that shown or discussed, including substantially concurrently or in reverse order, depending upon the functionality involved, as would be understood by those skilled in the art.

In the step S101, the system controller 119 accepts selection of the content to be reproduced in accordance with a command or the like input via the user input I/F section 118.

In the step S102, the system controller 119 controls the reproduction of the content, whose selection is accepted by the process of the step S101, via the reproduction control section 115. Thus, the data of the video pictures of the content recorded in the recording medium section 105 is output to the reproduction processing section 109.

In the step S103, the system controller 119 controls the reproduction processing section 109 to perform a process for buffering the data to the buffer memory 141. Thus, a part of the video data to be input to the reproduction processing section 109 corresponding to a predetermined period of time, for example, is held in the buffer memory 141.

In the step S104, the system controller 119 judges whether or not the recording/reproducing device 100 is presently set to the automatic display mode, and if it is judged that the recording/reproducing device 100 is presently set to the automatic display mode, the process proceeds to the step S105.

In the step S105, the system controller 119 controls the characteristic data detection section 116 to detect the amount of characteristic of the video data, which is presently being reproduced, and operates the evaluation value for detecting the highlight scene. It should be noted here that the evaluation value is defined to be a value obtained by performing a predetermined operation on a plurality of characteristic amounts generated from a plurality of characteristic data acquired in accordance with the video data or the audio data of the content to be reproduced, for example.

In the step S106, the system controller 119 judges whether or not the highlight scene has been detected based on the evaluation value operated in the process of the step S105, and if it is judged that the highlight scene has been detected, the process proceeds to the step S107 to perform the thumbnail display process described later with reference to FIG. 6.

The thumbnail display process in the step S107 shown in FIG. 5 will hereinafter be explained in detail with reference to the flowchart shown in FIG. 6.

In the step S121, the system controller 119 controls the video decode processing section 113 to generate the thumbnail images corresponding to the highlight scene, which is judged to be detected in the process of the step S106 shown in FIG. 5. It should be noted that a plurality of thumbnail images (e.g., K images) is generated in accordance with one highlight scene, and the thumbnail images according to a highlight scene are generated through the following process, for example.

Figure 7:
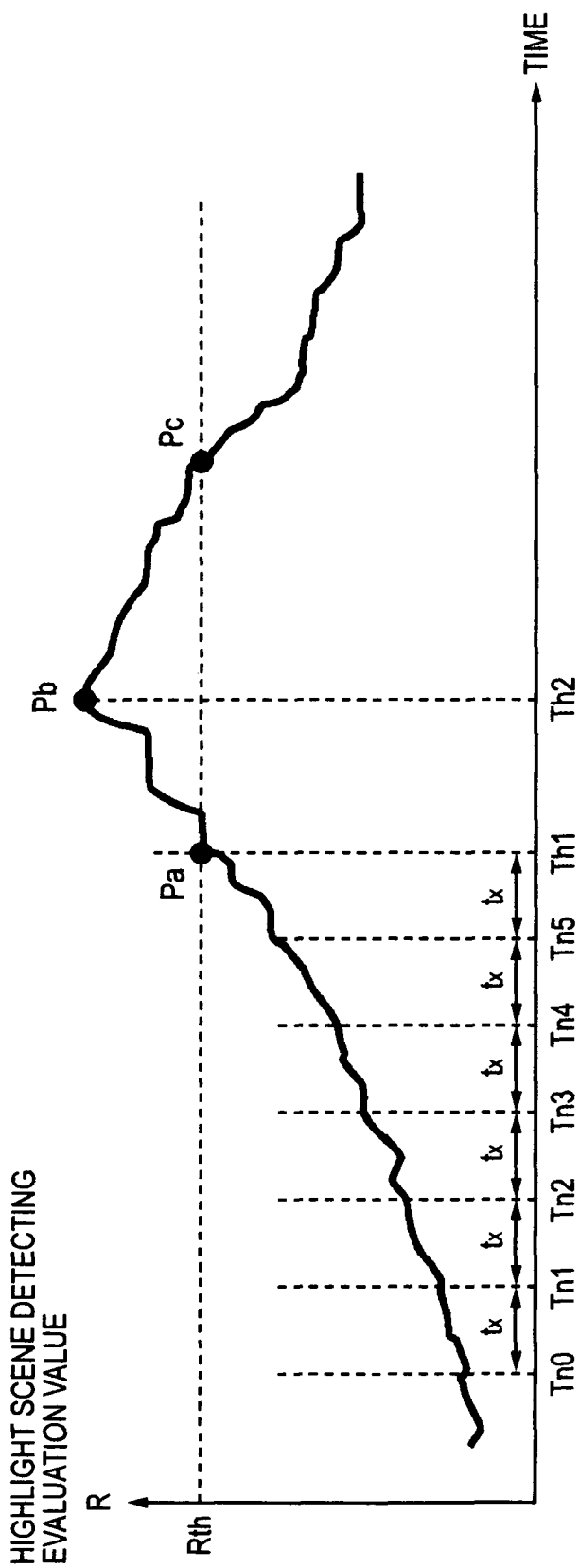
FIG. 7 is a time chart showing an example of an evaluation value for detecting a highlight scene in accordance with an exemplary embodiment of the inventions.

FIG. 7 is a chart showing an example of a highlight scene detecting evaluation value, which is the evaluation value operated in the process of step S105 described above and for detecting the highlight scene.

The highlight scene detecting evaluation value can be operated based on, for example, a predetermined audio level, a predetermined audio power, a predetermined audio spectrum, and so on with respect to the audio signal. And, it can be operated based on a predetermined brightness or color-difference signal level, a predetermined brightness or color-difference signal power, a predetermined brightness or color-difference signal spectrum with respect to the video signal.

For example, since soccer program has a characteristic that the level of the sound such as a cheer becomes higher in a goal scene, it is possible to use the value of the characteristic data obtained by operating the moving average of the sound level for every predetermined interval as the highlight scene detecting evaluation value with respect to the audio signal. Further, since there is a good chance of displaying large telop on the screen in a scoring scene of a sports program such as a soccer program or a baseball program, it is also possible to use the value of the characteristic data for detecting the telop as the highlight scene detecting evaluation value. Further, it can be assumed that photoflash for a photo shoot increases in the scene of the player of the game interview of a sports program, it is also possible to use the value of the characteristic data relating to the brightness of the image as the highlight scene detecting evaluation value. Or alternatively, it can be arranged that the value operated by weighting the all or a part of the characteristic data described above becomes the highlight scene detecting evaluation value.

In FIG. 7, the horizontal axis denotes time, and it is assumed that time advances from the left to the right in the drawing. Further, the vertical axis denotes the value of the highlight scene detecting evaluation value, and the value Rth is defined as a threshold value for specifying the highlight scene. The highlight scene can be defined as, for example, an image corresponding to the frame at the time point Th1 when the highlight scene detecting evaluation value exceeds the value Rth (the point Pa in the drawing), or an image corresponding to the frame at the time point Th2 when the highlight scene detecting evaluation value has the highest value (the point Pb in the drawing) in the interval (the interval between the point Pa and the point Pc) in which the highlight scene detecting evaluation value exceeds the value Rth.

For example, if the image of the frame corresponding to the time point Th1 is detected as the highlight scene (the image of the frame Sn shown in FIG. 2), time points for specifying the frames of the thumbnail images are designated to, for example, a time point Tn5 time tx before the time point Th1, a time point Tn4 time tx before the time point Tn5, a time point Tn3 time tx before the time point Tn4, and so on, and the six images respectively corresponding to the frames at the time points Tn0 through Tn5 are used as the thumbnail images (the images of the frames Sn-6 through Sn-1 shown in FIG. 2).

Further, for example, in the case of the content, which has already been recorded by the recording/reproducing device 100, the waveform of the highlight scene detecting evaluation value can easily be acquired prior to displaying the thumbnail images. Therefore, it can also be arranged that the thumbnail images corresponding to the period between the point Pa and the point Pc are displayed in addition to the thumbnail images corresponding to the time points Tn0 through Tn5.

In the case in which the replay image is displayed in the area of the display screen 201 except the area 202, it is possible to replay the video data in a predetermined period immediately before a time point corresponding to either one of the points Pa through Pc.

Figure 8:
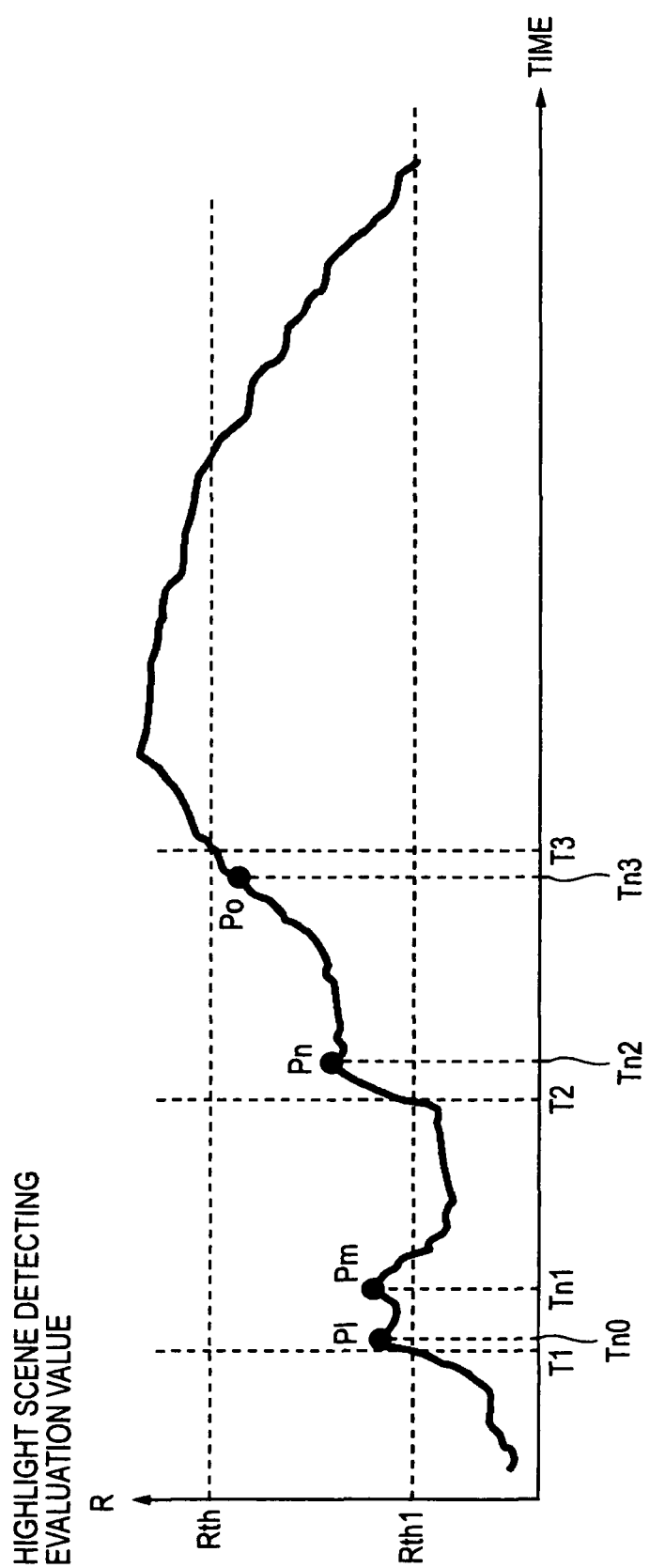
FIG. 8 is a time chart showing a further example of the evaluation value for detecting a highlight scene in accordance with an exemplary embodiment of the inventions.

FIG. 8 is a chart showing another example of the highlight scene detecting evaluation value, which is the evaluation value operated in the process of step S105 described above and for detecting the highlight scene.

In FIG. 8, the horizontal axis denotes time, and it is assumed that time advances from the left to the right in the drawing. Further, the vertical axis represents the value of the highlight scene detecting evaluation value, the value Rth is defined as the threshold value for specifying the highlight scene, and a value Rth1 is defined as a threshold value for specifying the thumbnail images.

For example, if the image of the frame corresponding to the time point T3 is detected as the highlight scene, time points Tn0 through Tn3 respectively corresponding to the points (the points Pl through Po shown in the drawing), each previous to the time point T3, exceeding the value Rth1 in the waveform of the highlight scene detecting evaluation value, and forming a local peak of the waveform, are designated as the time points for specifying the frames of the thumbnail images, and the images of the frames respectively corresponding to the time points Tn0 through Tn3 are used as the thumbnail images.

Further, if there are a large number of points each exceeding the value Rth1 and forming a local peak in the waveform of the highlight scene detecting evaluation value, it can be arranged that a period previous to the time point (T3) of the highlight scene is segmented into predetermined units, and a predetermined number of frames of the thumbnail images are specified in the time period between the time points T1 and T2, for example, and a predetermined number of frames of the thumbnail images are specified in the time period between the time points T2 and T3.

Figure 9:
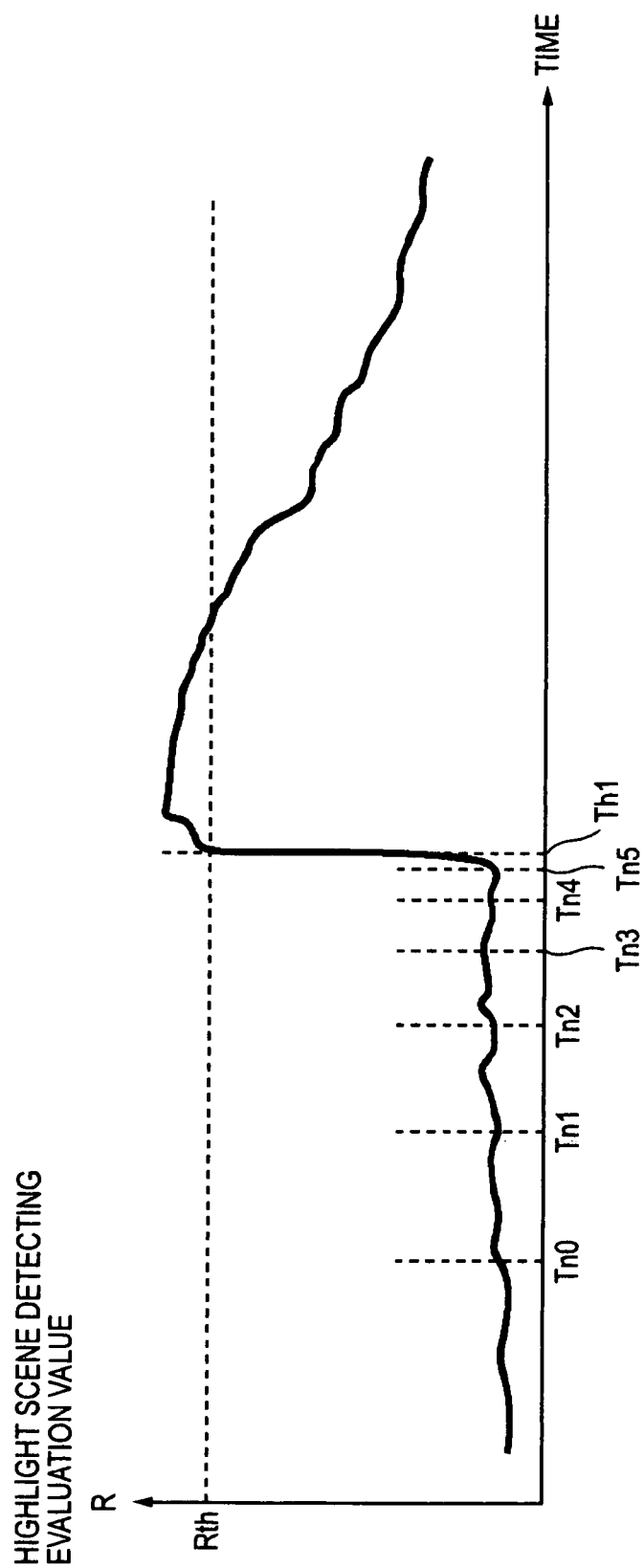
FIG. 9 is a time chart showing still another example of the evaluation value for detecting a highlight scene in accordance with an exemplary embodiment of the inventions.

FIG. 9 is a chart showing still another example of the highlight scene detecting evaluation value, which is the evaluation value operated in the process of step S105 described above and for detecting the highlight scene.

In FIG. 9, the horizontal axis denotes time, and it is assumed that time advances from the left to the right in the drawing. Further, the vertical axis denotes the value of the highlight scene detecting evaluation value, and the value Rth is defined as a threshold value for specifying the highlight scene.

For example, if the image of the frame corresponding to the time point Th1 is detected as the highlight scene, the time points Tn5 through Tn0 previous to the time point Th1 are designated as the time points for specifying the frames of the thumbnail images. However, in the case as shown in FIG. 9, the waveform of the highlight scene detecting evaluation value rapidly rises around the time point Th1, and therefore in that case, it is conceivable that there is rapid switching from a monotonous scene to an important scene (a highlight scene). In such a case, in order for offering the user the process to the highlight scene in an easily understood manner, it is preferable to generate many thumbnail images at time points around the highlight scene. Therefore, the more time points for specifying the thumbnail images are designated in the nearer time zone to the time point Th1. For example, the time interval between the time points Th1 and Tn5 and the time interval between the time points Tn5 and Tn4 are set shorter than the time interval between the time points Tn2 and Tn1 and the time interval between the time points Tn1 and Tn0, respectively.

Further, in the case shown in FIG. 9, similarly to the case shown in FIG. 7, it can also be arranged that the additional thumbnail images are generated at the predetermined time points in the area where the value of the highlight scene detecting evaluation value exceeds the value Rth in the waveform of the highlight scene detecting evaluation value.

It can also be arranged that the highlight scene and the thumbnail images corresponding to the highlight scene can be specified (generated) using either one of the methods explained with reference to FIGS. 7 through 9, alternatively. For example, it can be arranged that the thumbnail images corresponding to the highlight scene are generated using a method previously designated based on the selection of the user, or it can also be arranged that either one of the methods explained with reference to FIGS. 7 through 9 is selected in accordance with the waveform of the highlight scene detecting evaluation value, and the thumbnail images corresponding to the highlight scene are generated using the method thus selected.

Figure 6:
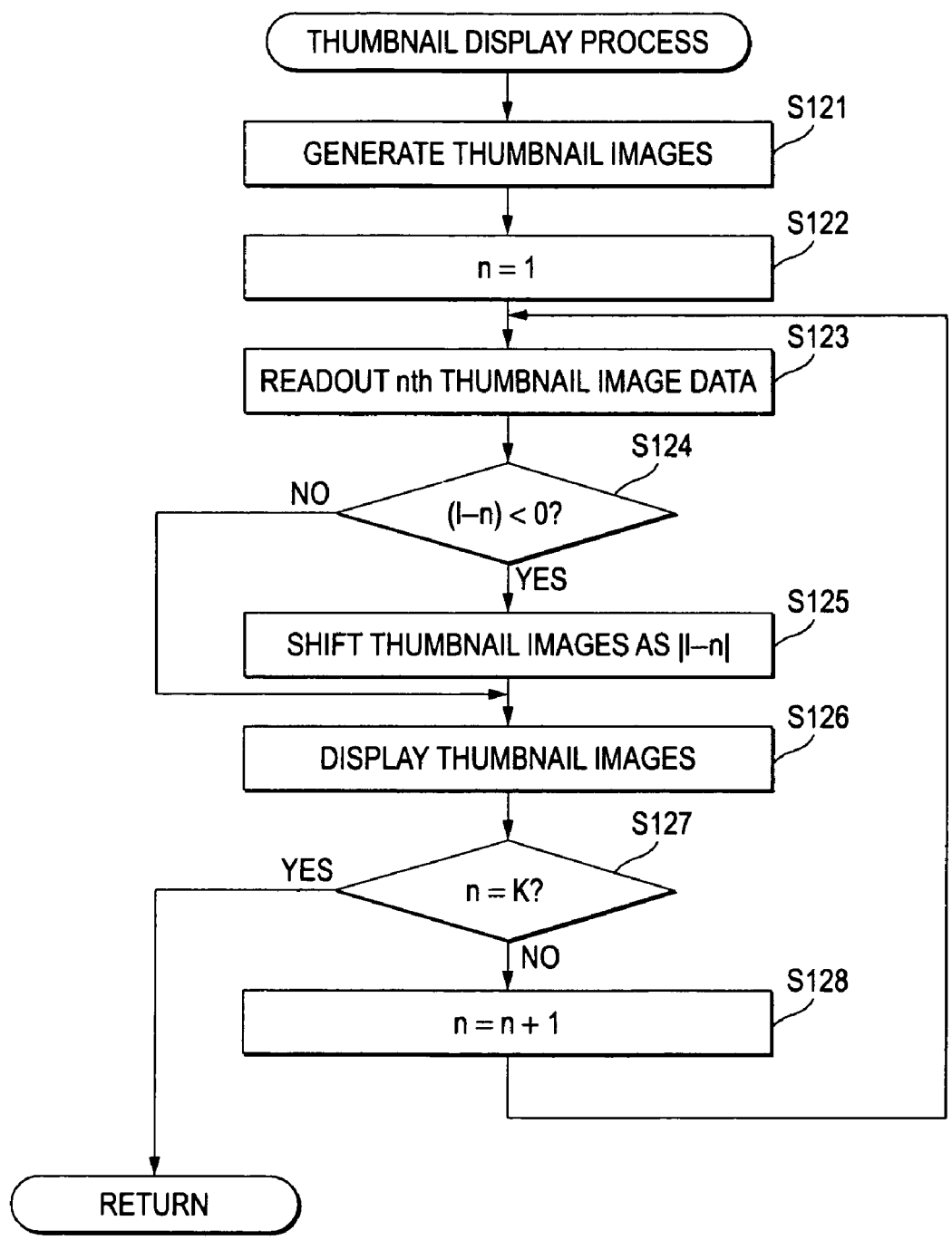
FIG. 6 is a flowchart of a thumbnail display process in accordance with an exemplary embodiment of the inventions.

Going back to FIG. 6, after the process of the step S121, the process proceeds to the step S122, and the system controller 119 sets the value of the counter n to one.

In the step S123, the system controller 119 reads out the data of the nth thumbnail image out of a plurality of thumbnail images generated in the process of the step S121.

In the step S124, the system controller 119 judges whether or not the difference (l−n) between the number l of the thumbnail images, which can simultaneously be displayed in the area 202, and the value of the counter n is smaller than zero, and if it is judged that the value (l−n) is smaller than zero, the process proceeds to the step S125, and the system controller 119 shifts the thumbnail images as much as the absolute value of the value (l−n). Namely, if the number of the thumbnail images to be displayed exceeds the number l of the thumbnail images, which can be simultaneously displayed in the area 202, the thumbnail images already displayed are shifted left in the screen, for example, so that the thumbnail images, which have already been displayed previously, can be removed from the screen to allow new thumbnail images to be displayed.

On the contrary, if it is judged in the step S124 that the value (l−n) is no smaller than zero, the process of the step S125 is skipped.

And, in the step S126, the system controller 119 controls the display processing section 120 to display the thumbnail images corresponding to the data read out in the process of the step S123 in the area 202 on the display screen 201 of the display device.

In the step S127, the system controller 119 judges whether or not the value of the counter n is equal to the value K (the number of thumbnail images generated in the process of the step S121), and if it is judged that the value of the counter n is not equal to the value K, the process proceeds to the step S128.

In the step S128, the system controller 119 increments the value of the counter n by one, and the process returns to the step S123 to repeatedly perform the process thereafter.

In the step S127, if it is judged that the value of the counter n is equal to the value K, the thumbnail display process is terminated.

Going back to FIG. 5, after the process of the step S107, the process proceeds to the step S108, and the system controller 119 judges whether or not the termination has been instructed, and if it is judged that the termination has not been instructed yet, the process goes back to the step S101 to repeatedly perform the process thereafter.

For example, if a command or the like instructing the termination of the image display process is input through the user input I/F section 118, it is judged that the termination has been instructed in the step S108, and the process is terminated.

It should be noted that, if it is judged in the step S104 that the recording/reproducing device 100 is not presently set to the automatic display mode, the process proceeds to the step S109 to perform regular display. In this case, the reproduced video pictures continue to be displayed on the display screen 201 of the display device as shown in FIG. 3, and no thumbnail display is performed.

Further, if it is judged in the step S106 that the highlight scene has not been detected, the process of the step S107 is skipped.

As described above, the highlight scene is detected and the thumbnail images are displayed in the recording/reproducing device 100. According to the above process, it becomes possible to, for example, display a heated scene (a highlight scene) in a live sports broadcast program or the like, thereby allowing the user to figure out the line of the game and so on in a short time, and it also becomes possible to, for example in a soccer game, offer the user the process to the goal such as a pass or dribbling right before the goal, thereby giving the user more information and enjoyment.

Although in the examples described above with reference to FIGS. 5 and 6, the examples are explained in which the thumbnail images corresponding to the highlight scene are displayed, there can be a number of highlight scenes in the content, which is presently reproduced. And, in such a case, if the thumbnail images each corresponding to respective highlight scenes are displayed, the number of the thumbnail images is increased and the video pictures (images) thus displayed might become difficult for the user to figure out.

Figure 10:
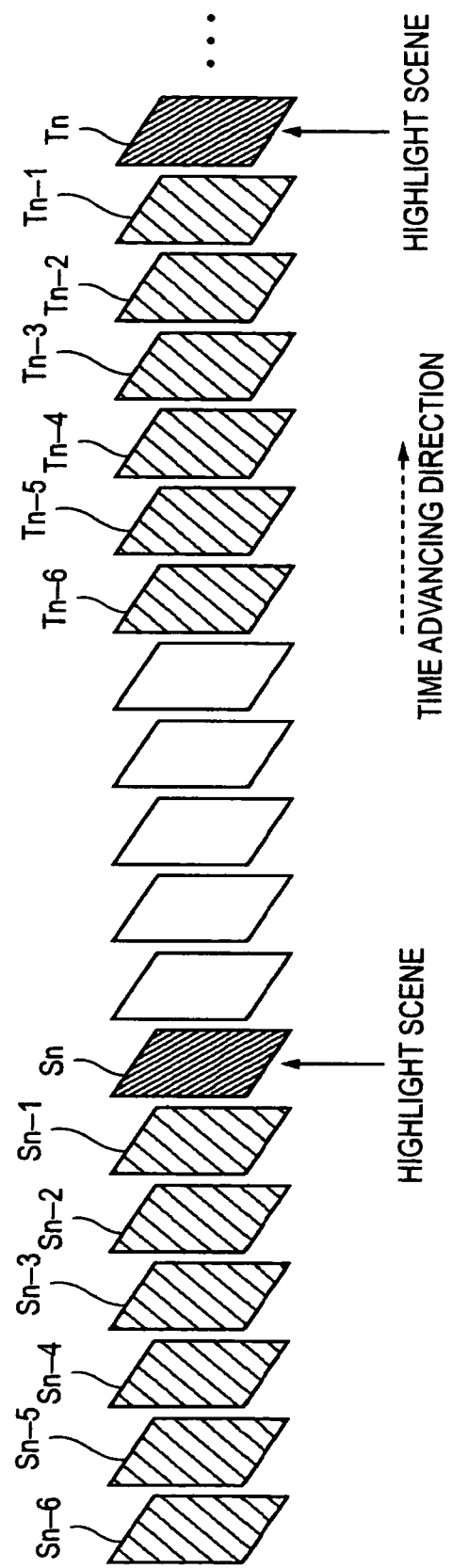
FIG. 10 is a content segment diagram showing an example of the case in which a frame Sn and a frame Tn each corresponding to a highlight scene are detected in accordance with an exemplary embodiment of the inventions.

FIG. 10 is a diagram showing an example of the case in which frames Sn and Tn each corresponding to a highlight scene are detected in a number of frames in video pictures to be recorded or reproduced in the recording/reproducing device 100, for example. In the drawing, it is assumed that time advances from the left to the right, and the video pictures respectively corresponding to the frames each expressed with a parallelogram in the drawing are reproduced sequentially.

As shown in FIG. 10, if in response to detection of the frames Sn and Tn each of which is a highlight scene, the images corresponding to the frames Sn-1 through Sn-6 are displayed as the thumbnail images corresponding to the highlight scene Sn, and the images corresponding to the frames Tn-1 through Tn-6 are displayed as the thumbnail images corresponding to the highlight scene Tn, the number of the thumbnail images is increased and the user might be confused.

Figure 11:
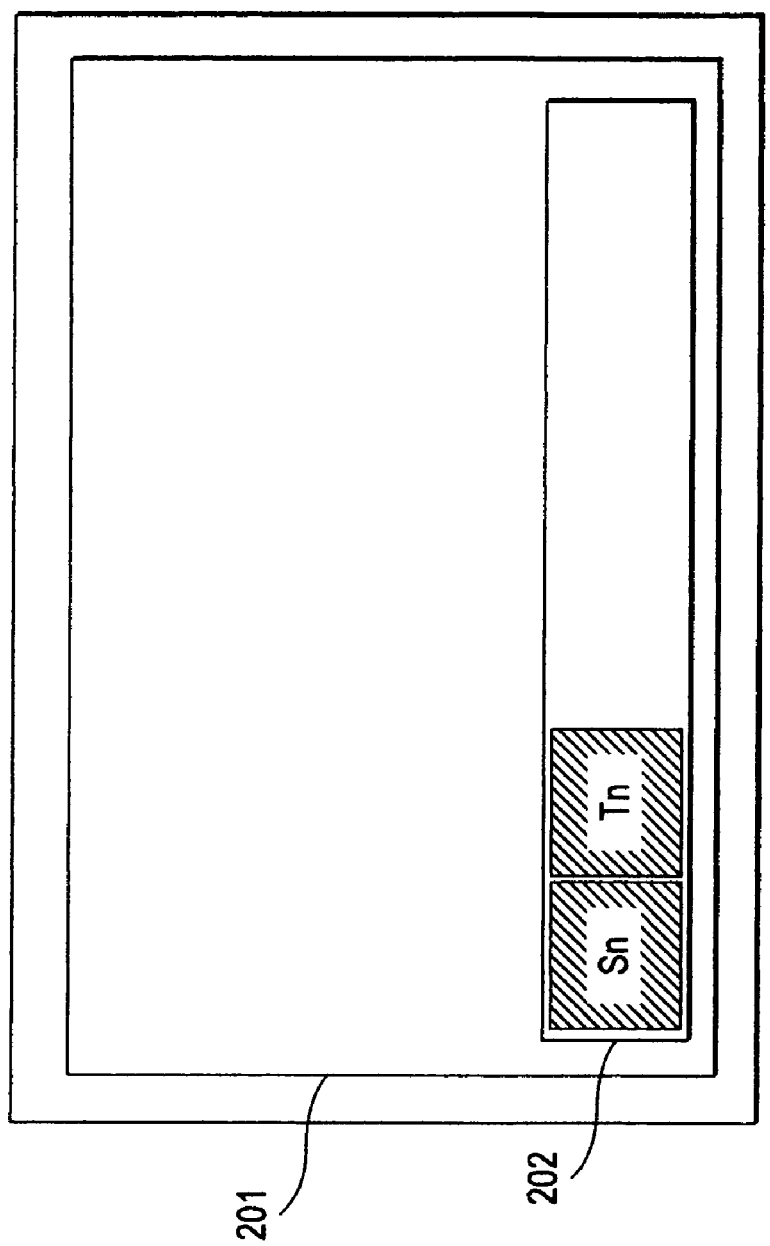
FIG. 11 is an another exemplary display screen of a display device or the like after the frame corresponding to the highlight scene has been detected.

In such a case, it can be arranged that the frame Sn and the frame Tn, each of which is the highlight scene, are displayed in the area 202 as the thumbnail images in the display device connected to the recording/reproducing device 100, for example, as shown in FIG. 11. It should be noted that the video picture, which is presently being reproduced, is displayed in the area of the display screen 201 except the area 202.

The image display process in the case in which the thumbnail images are displayed as shown in FIG. 11 will now be explained with reference to the flowchart shown in FIG. 12.

In the step S201, the system controller 119 accepts selection of the content to be reproduced in accordance with a command or the like input via the user input I/F section 118.

In the step S202, the system controller 119 controls the reproduction of the content, whose selection is accepted by the process of the step S201, via the reproduction control section 115. Thus, the data of the video pictures of the content recorded in the recording medium section 105 is output to the reproduction processing section 109.

In the step S203, the system controller 119 controls the reproduction processing section 109 to perform a process for buffering the data to the buffer memory 141. Thus, a part of the video data to be input to the reproduction processing section 109 corresponding to a predetermined period of time, for example, is held in the buffer memory 141.

In the step S204, the system controller 119 judges whether or not the recording/reproducing device 100 is presently set to the automatic display mode, and if it is judged that the recording/reproducing device 100 is presently set to the automatic display mode, the process proceeds to the step S205.

Figure 13:
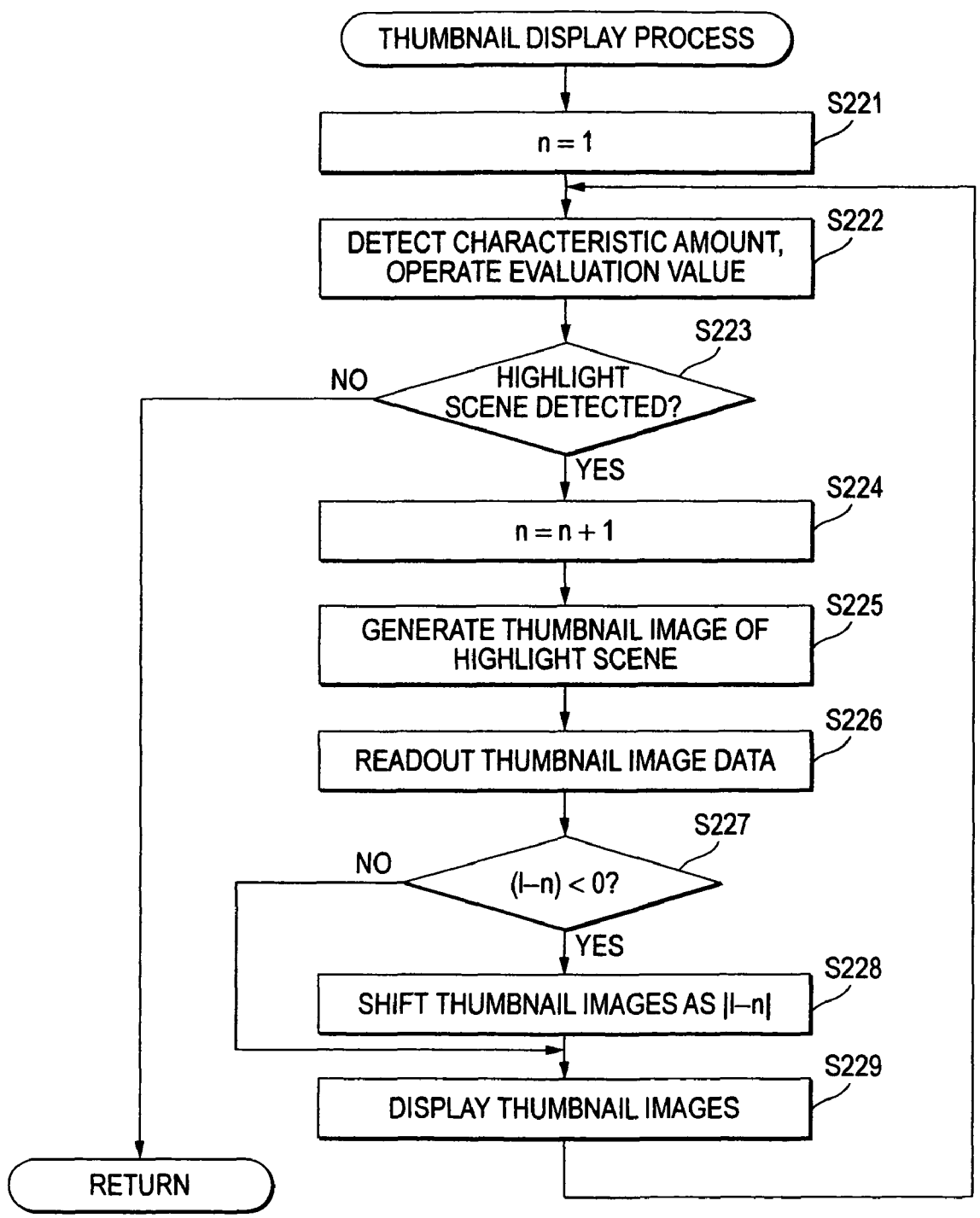
FIG. 13 is a flowchart of a further example of the thumbnail display process in accordance with an exemplary embodiment of the inventions.

In the step S205, the thumbnail display process described later with reference to FIG. 13 is performed.

The thumbnail display process in the step S205 shown in FIG. 12 will hereinafter be explained in detail with reference to the flowchart shown in FIG. 13.

In the step S221, the system controller 119 sets the value of the counter n to zero.

In the step S222, the system controller 119 controls the characteristic data detection section 116 to detect the amount of characteristic of the video data, which is presently being reproduced, and operates the evaluation value for detecting the highlight scene.

In the step S223, the system controller 119 judges whether or not the highlight scene has been detected based on the evaluation value operated in the process of the step S222, and if it is judged that the highlight scene has been detected, the process proceeds to the step S224, and the system controller 119 increments the value of the counter n by one.

In the step S225, the system controller 119 controls the video decode processing section 113 to generate the thumbnail image (e.g., the image corresponding to the frame Sn or Tn shown in FIG. 10) of the highlight scene, which is judged to be detected in the process of the step S223.

In the step S226, the system controller 119 reads out the data of the thumbnail image generated in the process of the step S225.

In the step S227, the system controller 119 judges whether or not the difference (l–n) between the number l of the thumbnail images, which can simultaneously be displayed in the area 202, and the value of the counter n is smaller than zero, and if it is judged that the value (l–n) is smaller than zero, the process proceeds to the step S228, and the system controller 119 shifts the thumbnail images as much as the absolute value of the value (l–n). Namely, if the number of the thumbnail images to be displayed exceeds the number l of the thumbnail images, which can be simultaneously displayed in the area 202, the thumbnail images already displayed are shifted left in the screen, for example, so that the thumbnail images, which have already been displayed previously, can be removed from the screen to allow new thumbnail images to be displayed.

On the contrary, if it is judged in the step S227 that the value (l–n) is no smaller than zero, the process of the step S228 is skipped.

And, in the step S229, the system controller 119 controls the display processing section 120 to display the thumbnail images corresponding to the data read out in the process of the step S226 in the area 202 on the display screen 201 of the display device.

After the process of the step S229, the process goes back to the step S223 to repeatedly perform the process thereafter.

In the step S223, if it is judged that no highlight scene has been detected, the thumbnail display process is terminated.

Figure 12:
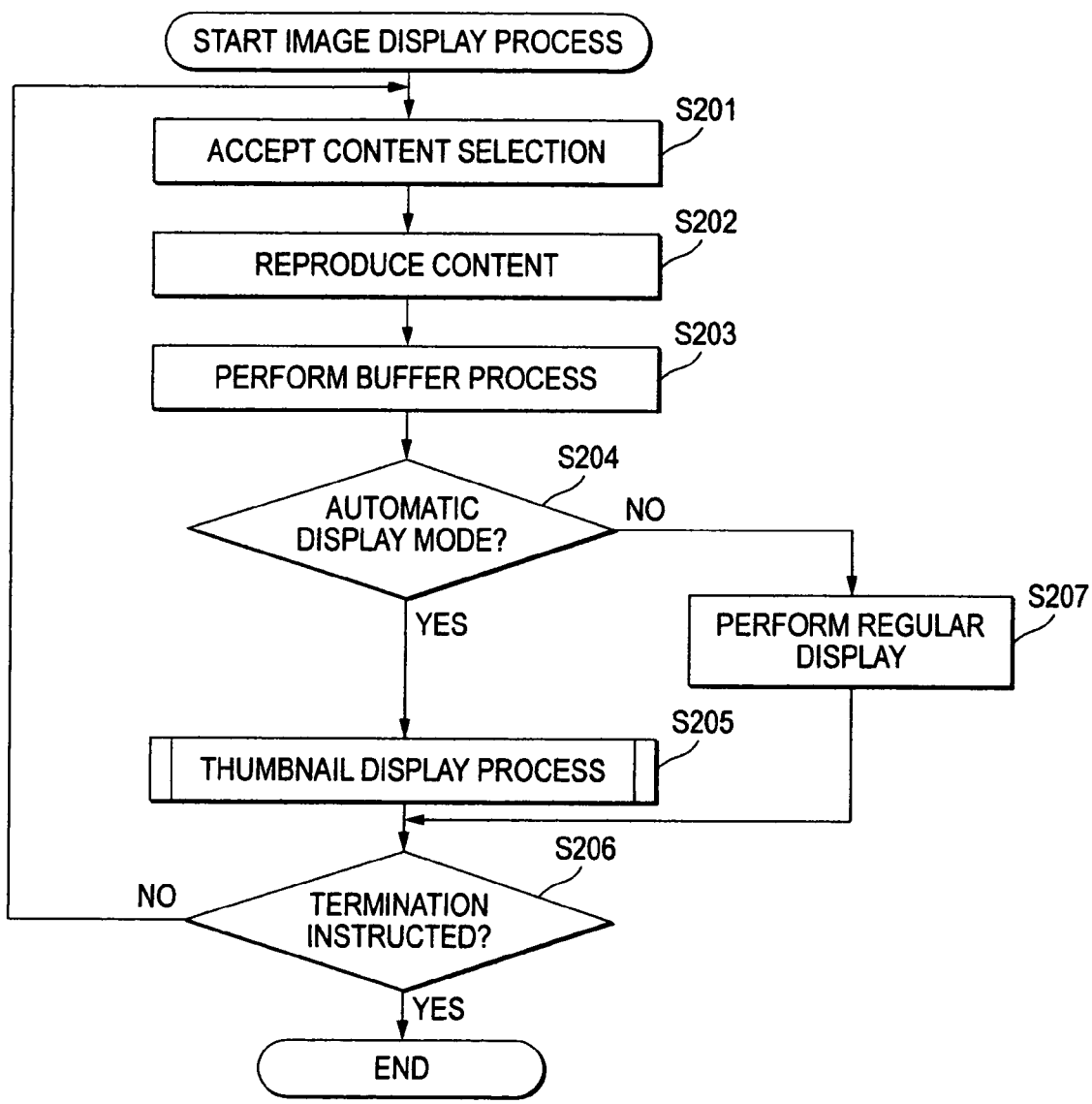
FIG. 12 is a flowchart of a further example of the image display process in accordance with an exemplary embodiment of the inventions.

Going back to FIG. 12, after the process of the step S205, the process proceeds to the step S206, and the system controller 119 judges whether or not the termination has been instructed, and if it is judged that the termination has not been instructed yet, the process goes back to the step S201 to repeatedly perform the process thereafter.

For example, if a command or the like instructing the termination of the image display process is input through the user input I/F section 118, it is judged that the termination has been instructed in the step S206, and the process is terminated.

It should be noted that, if it is judged in the step S204 that the recording/reproducing device 100 is not presently set to the automatic display mode, the process proceeds to the step S207 to perform regular display. In this case, the reproduced video pictures continue to be displayed on the display screen 201 of the display device as shown in FIG. 3, and no thumbnail display is performed.

As described above, the highlight scene is detected and the thumbnail images are displayed in the recording/reproducing device 100. According to the above process, the display easy for the user to figure out can be performed even in the case in which a plurality of highlight scenes is detected.

Incidentally, it can be arranged that the video picture for a predetermined period of time immediately before the detected highlight scene is displayed as a replay image in the case in which the highlight scene has been detected in the recording/reproducing device 100.

Figure 14:
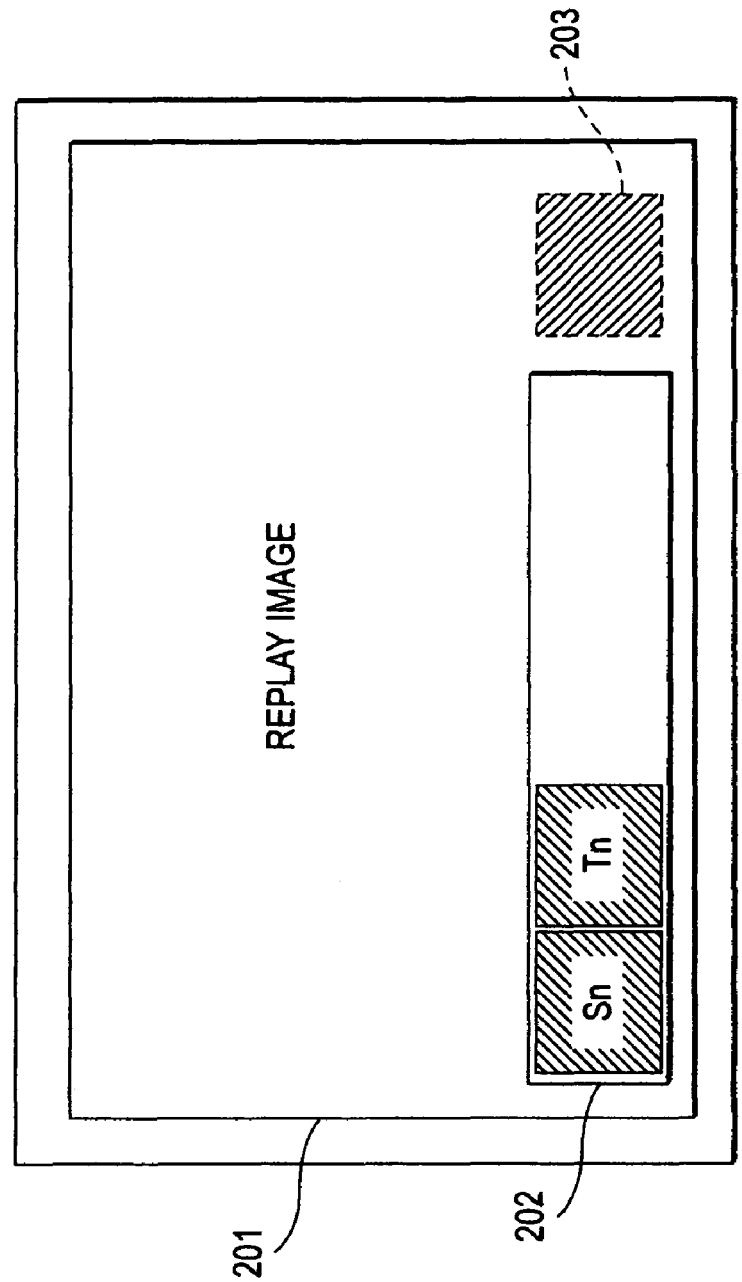
FIG. 14 is a diagram showing still another display screen of a display device after the frame corresponding to the highlight scene has been detected in accordance with an exemplary embodiment of the inventions.

For example, in the display state of the display device as shown in FIG. 11, if either one of the highlight scenes is selected by an operation input through the user input I/F section 118 from the highlight scenes displayed in the area 202 as the thumbnail images, it can be arranged that, as shown in FIG. 14, the video picture for a predetermined time period immediately before the selected highlight scene is displayed as the replay image on the display screen 201 except the area 202 or the area 203, and the video picture presently reproduced is displayed in the area 203.

It should be noted that whether or not the replay image is displayed when the highlight scene is designated (selected) is judged from the mode set previously, and if the recording/reproducing device 100 is set to the replay mode, as shown in FIG. 14, it is assumed that the video picture for the predetermined time period immediately before the highlight scene is displayed as the replay image.

The image display process in the recording/reproducing device 100 in this case will be explained with reference to the flowchart shown in FIG. 15.

In the step S301, the system controller 119 accepts selection of the content to be reproduced in accordance with a command or the like input via the user input I/F section 118.

In the step S302, the system controller 119 controls the reproduction of the content, whose selection is accepted by the process of the step S301, via the reproduction control section 115. Thus, the data of the video pictures of the content recorded in the recording medium section 105 is output to the reproduction processing section 109.

In the step S303, the system controller 119 judges whether or not the recording/reproducing device 100 is presently set to the replay mode, and if it is judged that the recording/reproducing device 100 is presently set to the replay mode, the process proceeds to the step S304.

In the step S304, the system controller 119 judges whether or not a highlight scene is included in the content, which is selected in the process of the step S301 and is presently being reproduced, and if it is judged that the highlight scene is included, the process proceeds to the step S305. It should be noted that in this moment, the thumbnail image of the highlight scene is displayed in the area 202 on the display screen 201 of the display device as shown in FIG. 11.

In the step S305, the highlight replay process described later with reference to FIG. 16 is performed.

The highlight replay process in the step S305 shown in FIG. 15 will hereinafter be explained in detail with reference to the flowchart shown in FIG. 16.

In the step S321, the system controller 119 accepts designation of the highlight scene in accordance with a command or the like input via the user input I/F section 118. In this case, in the display screen 201 shown in FIG. 11, for example, either one of the images (images of the frames Sn and Tn) of the highlight scenes displayed in the area 202 is selected by the user.

In the step S322, the system controller 119 controls the reproduction processing section 109 to perform a process for buffering the data to the buffer memory 141. Thus, a part of the video data to be input to the reproduction processing section 109 corresponding to a predetermined period of time immediately before the selected highlight scene is held in the buffer memory 141.

In the step S323, the system controller 119 controls the reproduction processing section 109 to reproduce the video data held in the process of the step S322, thereby performing the replay reproduction. Thus, the replay image is displayed on the display screen 201 except the areas 202 and 203 as shown in FIG. 14.

In the step S324, the system controller 119 judges whether or not the highlight scene has been reproduced in the replay reproduction performed in the process of the step S323. For example, if the image corresponding to the frame Sn is designated as the highlight scene in the process in the step S321, the video data previous to the frame Sn and for a predetermined period of time immediately before the frame Sn is held in the buffer memory 141 in the process of the step S322, and the video data held in the buffer memory 141 in the process of the step S322 is sequentially reproduced from the earliest data in the step S323. And, when the data of the frame Sn is finally reproduced, it is judged in the step S324 that the highlight scene has been reproduced.

If it is judged in the step S324 that the highlight scene has not been reproduced yet, the process proceeds to the step S326, and the system controller 119 judges, for example, whether or not termination has been instructed by the user. If it is judged that no instruction of termination has been made, the process goes back to the step S323 to repeatedly perform the process thereafter.

On the contrary, if it is judged in the step S324 that the highlight scene has already been reproduced, the process proceeds to the step S325, and the system controller 119 judges whether or not designation of other highlight scenes is made. In this moment, for example, a message or the like for prompting the judgment of whether or not selection of the highlight scene is performed is output on the display screen of the display device or the like, and whether or not designation of other highlight scenes is performed is judged based on the command or the like input by the user in response to the message. In the step S325, if it is judged that the designation of other highlight scenes is performed, the process goes back to the step S321 to repeatedly perform the process thereafter.

If it is judged in the step S325 that the designation of other highlight scenes is not made, or if it is judged in the step S326 that the termination is instructed, the highlight replay process is terminated.

Figure 15:
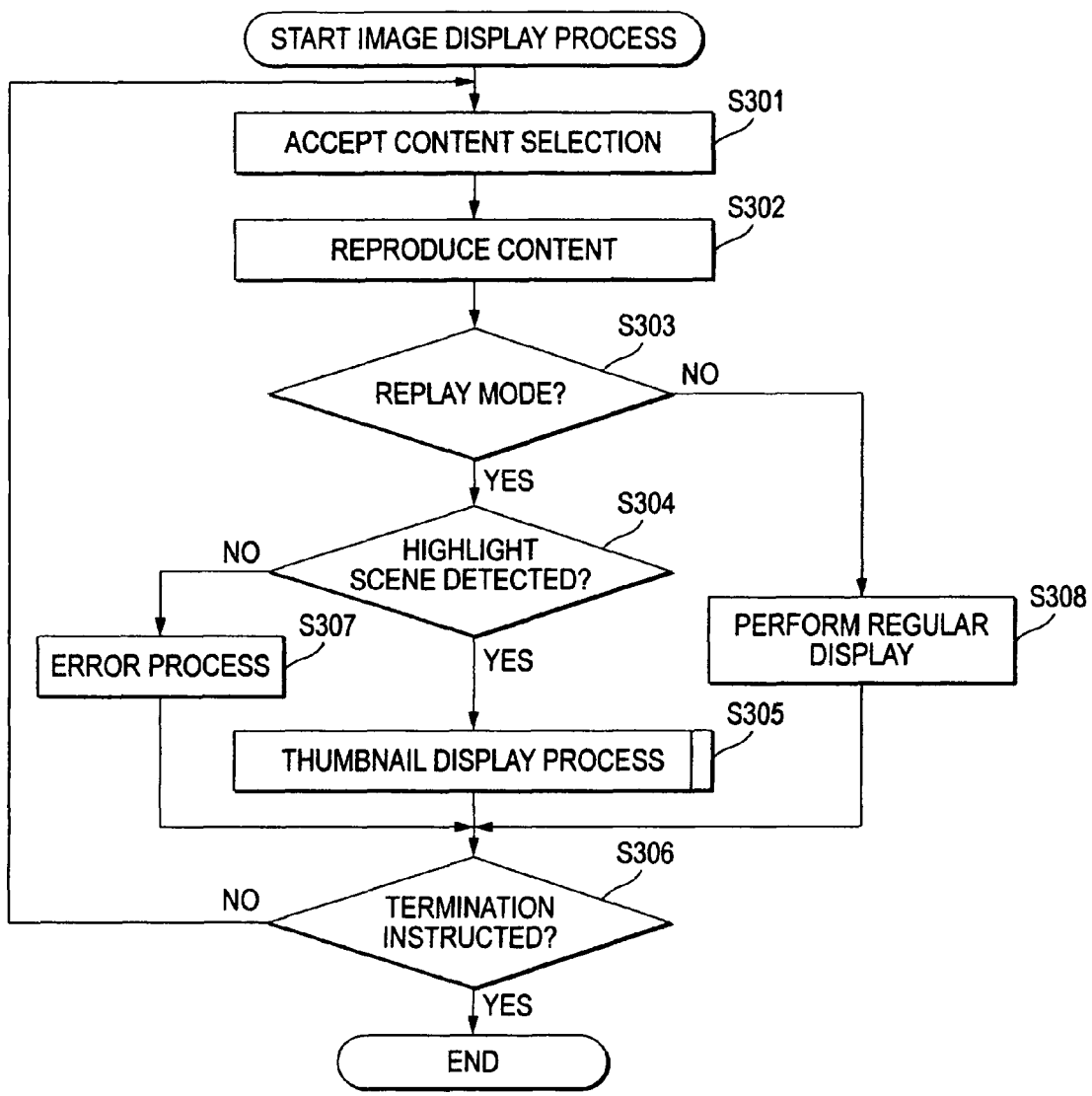
FIG. 15 is a flowchart of a further example of the image display process in accordance with an exemplary embodiment, of the inventions.

Going back to FIG. 15, after the process of the step S305, the process proceeds to the step S306, and the system controller 119 judges whether or not the termination has been instructed, and if it is judged that the termination has not been instructed yet, the process goes back to the step S301 to repeatedly perform the process thereafter.

For example, if a command or the like instructing the termination of the image display process is input through the user input I/F section 118, it is judged that the termination is instructed in the step S306, and the process is terminated.

It should be noted that, if it is judged in the step S303 that the recording/reproducing device 100 is not presently set to the replay mode, the process proceeds to the step S308 to perform regular display. In this case, the reproduced video pictures continue to be displayed on the display screen 201 of the display device as shown in FIG. 3, and no thumbnail display is performed.

Further, if it is judged in the step S304 that no highlight scene is included, the process proceeds to the step S307 to perform an error process. Thus, it is output as, for example, a warning message by an image or a sound that no highlight scene is included in the selected content.

As described above, the detected highlight scene is designated, and the replay image is displayed in the recording/reproducing device 100. According to the above process, the process to the highlight scene can be displayed in a more easily understood manner.

It should be noted that, although it is explained that the video picture presently reproduced is displayed in the area 203 in FIG. 14, it can be arranged that, for example, no video picture is displayed in the area 203, and the video picture currently reproduced is displayed on the display screen 201 except the area 202 after the display of the replay image has been terminated. In this case, it can be arranged that the data of the video picture, which is presently being reproduced, is held in the buffer memory 141 and so on from the time point when the display of the replay image is started to the time point when the display of the replay image is terminated, and when the display of the replay image is terminated, the display of the video picture presently reproduced is performed from the time point when the display of the replay image is started. According to the above process, the video picture missed while displaying the replay image can be watched afterward.

It should be noted that it is possible to perform replay reproduction at a modified reproduction rate besides the normal reproduction rate (single reproduction rate). For example, it is also possible to perform the predetermined modified rate reproduction by controlling the readout of the data from the buffer memory 141 by the system controller 119 in accordance with the predetermined modified reproduction rate.

The following cases are possible in the modified rate replay reproduction.

Firstly, the case in which the reproduction at a predetermined modified reproduction rate set previously in a predetermined interval of the replay reproduction will be explained.

For example, by performing the replay slow reproduction at, for example, four-fifths speed, it becomes possible to have fun by reproducing, at a slow rate, the process to the highlight scene changed rapidly. It is possible that the predetermined modified reproduction rate set previously is set to four-fifths speed as described above as an initial setting value, and can be changed by the user as desired.

The case in which the replay reproduction is performed by adaptively controlling the modified reproduction rate in accordance with the characteristic of the highlight scene detecting evaluation value will now be explained.

For example, in FIG. 7, it is possible that the start position of the replay reproduction in the replay reproduction mode is set to Tn0, the reproduction rate in the interval to the threshold position of Th1 (the interval between Tn0 and Th1) is set to Na times speed, and the reproduction rate in the interval around the highlight scene (the interval between Th1 and Th2+α, where α denotes a predetermined margin interval), where the highlight scene detecting evaluation value is maximum is set to four-fifths speed. It should be noted that it is possible to use, for example, one and two-tenths speed besides normal single reproduction rate as the Na times speed to increase the reproduction rate compared to the normal reproduction rate.

According to the above configuration, in the sports program such as a soccer game, the interval around the scene, which the user may find most interesting, can be watched at slow rate while reconfirming it, thus the efficient replay reproduction can be performed.

Further, it is possible to perform the replay reproduction operation through the interval between Tn0 and Th2+α while changing the reproduction rate, for example, continuously or stepwise.

It should be noted that the reproduction rate control in the replay reproduction can similarly be adopted to the cases in which the characteristic of the highlight scene detecting evaluation value is as shown in FIG. 8 or 9. In this case, since the position where the predetermined highlight scene detecting evaluation value has a peak or the position where it has a local maximum value can be detected as described above, it is possible that the replay reproduction is performed at a predetermined Na times speed in the interval from the start position of the replay reproduction to the peak position of the highlight scene detecting evaluation value or to the position around the local maximum value thereof, and the replay reproduction is performed at a predetermined low reproduction rate such as four-fifths speed in the peak position of the highlight scene detecting evaluation value or the adjacent area to the local maximum value.

Further, it is possible that the number of times of the replay reproduction in the replay reproduction process is set to one time as an initial setting, and can be changed by the user setting to, for example, two times replay reproduction. By thus performing the replay reproduction repeatedly, in a sports program such as golf or tennis program, the user can practice the sports by following the play of the player getting in the match in the program. It should be noted that the settable number of times of the replay reproduction is not limited to two times but can be three or more times.

Although in the above description, an example of the television receiver 100 applying the invention is explained, the invention can also be applied to a multipurpose personal computer 500, PDA, or like portable computing device. FIG. 17 is a block diagram showing a configuration example of a personal computer 500.

In FIG. 17, a central processing unit (CPU) 501 performs various processes in accordance with a program stored in a read only memory (ROM) 502 or a program loaded to a random access memory (RAM) 503 from a storage section 508. In the RAM 503, there is stored data necessary for the CPU 501 to perform the various processes.

The CPU 501, the ROM 502, and the RAM 503 are connected to each other via a bus 504. An input/output interface 505 is also connected to the bus 504.

An input section 506 mainly composed of a keyboard and a mouse, an output section 507 mainly composed of a display device including a cathode ray tube (CRT) and a liquid crystal display (LCD) and a loudspeaker, a storage section 508 mainly composed of a hard disk drive, and a communication section 509 mainly composed of a network interface card such as a modem or a LAN card are connected to the input/output interface 505. The communication section 509 performs a communication process via a network including the Internet.

The input/output interface 505 is also connected to a drive 510 according to needs, to which a removable medium 511 such as a magnetic disk, an optical disk, a magneto optical disk, or a semiconductor memory is loaded as desired, and a computer program readout therefrom is installed in the storage section 508 according to needs.

It should be noted that the series of processes described above can be performed by hardware or by software. In the case in which the series of processes described above is performed by the software, the program composing the software is installed from the network such as the Internet, or a recording medium composed mainly of the removable medium 511.

It should be noted that the recording medium includes not only those composed of the removable medium 511 distributed separately from the device shown in FIG. 17 for delivering the program to the user, including the magnetic disk (including Floppy Disk®), the optical disk (including compact disc read only memory (CD-ROM) and digital versatile disc (DVD)), the magneto optical disk (including mini disc (MD)®), and the semiconductor memory each including the program recorded therein, but also those distributed to the user in the condition of previously built in the device and mainly composed of the ROM 502 and the hard disk drive included in the storage section 508 each including the program recorded therein.

Obviously, readily discernible modifications and variations of the present invention are possible in light of the above teachings. It is therefore to be understood that within the scope of the appended claims, the invention may be practiced otherwise than as specifically described herein. For example, while described in terms of both software and hardware components interactively cooperating, it is contemplated that the system described herein may be practiced entirely in software. The software may be embodied in a carrier such as magnetic or optical disk, or a radio frequency or audio frequency carrier wave.

Thus, the foregoing discussion discloses and describes merely exemplary embodiment of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The present invention contains subject matter related to Japanese Patent Application JP 2005-309336 filed in the Japan Patent Office on Oct. 25, 2005, the entire contents of which being incorporated herein by reference.

The invention claimed is:

1. A display control device, comprising:
reproduction means for reproducing content;
evaluation value operation means including a system controller for operating evaluation value for specifying a notable scene in the content, based on characteristic data included in one of video data and audio data of the content to be reproduced by the reproduction means, and for detecting a predetermined scene in the content;
scene detection judgment means for judging whether or not the notable scene in the content has been detected, based on the evaluation value operated by the evaluation value operation means; and
related image display control means for displaying, in response to the judgment of detection of the notable scene in the content by the scene detection judgment means, a related image based on an image of the notable scene thus detected, wherein
the related image is obtained by generating a still image from a video picture reproduced at a previously designated time point, the video picture being included in the video data of a predetermined period of time to be reproduced previously to the notable scene.

2. The display control device according to claim 1, wherein the video picture of the content, which is presently under reproduction, is further displayed together with the related image.

3. The display control device according to claim 1, wherein the related image display control means generates the related image by generating a still image based on the video data of the notable scene.

4. The display control device according to claim 3, wherein video data of a predetermined period of time immediately before the notable scene corresponding to selected one of the related images is reproduced more than once.

5. The display control device according to claim 1, wherein the related image is obtained by generating the still image from the video picture reproduced at a time point when the evaluation value operated by the evaluation value operation means satisfies a previously designated criteria.

6. The display control device according to claim 1, wherein the related images in the content is detected based upon the evaluation value which identifies a rate of change between characteristic data of the video and/or audio data.

7. The display control device according to claim 1, wherein the related image display control means controls display of the related image based upon a number of notable scenes.

8. The display control device according to claim 1, wherein video data of a predetermined period of time immediately before the notable scene is reproduced by the reproduction means at a speed based upon the evaluation value.

9. A display control device, comprising:
a reproduction section reproducing content;
an evaluation value operation section including a system controller for operating evaluation value for specifying a notable scene in the content, based on characteristic data included in one of video data and audio data of the content to be reproduced by the reproduction section, and for detecting a predetermined scene in the content;
a scene detection judgment section judging whether or not the notable scene in the content has been detected, based on the evaluation value operated by the evaluation value operation section; and
a related image display control section displaying, in response to the judgment of detection of the notable scene in the content by the scene detection judgment section, a related image based on an image of the notable scene thus detected, wherein
the related image is obtained by generating a still image from a video picture reproduced at a previously designated time point, the video picture being included in the video data of a predetermined period of time to be reproduced previously to the notable scene.

10. The display control device according to claim 9, wherein
the related images in the content is detected based upon the evaluation value which identifies a rate of change between characteristic data of the video and/or audio data.

11. The display control device according to claim 9, wherein
the related image display control section controls display of the related image based upon a number of notable scenes.

12. The display control device according to claim 9, wherein
video data of a predetermined period of time immediately before the notable scene is reproduced by the reproduction section at a speed based upon the evaluation value.

13. A display control method comprising:
reproducing content;
operating evaluation value for specifying a notable scene in the content, based on characteristic data included in one of video data and audio data of the content to be reproduced, and for detecting a predetermined scene in the content;
judging whether or not the notable scene in the content has been detected, based on the operated evaluation value; and
controlling, in response to the judgment of detection of the notable scene in the content, to display a related image with a predetermined size based on an image of the notable scene thus detected, wherein
the related image is obtained by generating a still image from a video picture reproduced at a previously designated time point, the video picture being included in the video data of a predetermined period of time to be reproduced previously to the notable scene.

14. The display control method according to claim 13, wherein
the related images in the content is detected based upon the evaluation value which identifies a rate of change between characteristic data of the video and/or audio data.

15. The display control method according to claim 13, wherein
the display of the related image based upon a number of notable scenes is controlled.

16. The display control method according to claim 13, wherein
video data of a predetermined period of time immediately before the notable scene is reproduced at a speed based upon the evaluation value.

17. A non-transitory computer readable storage medium including computer program instructions that cause a computer to implement a method of identifying ratable content comprising:
reproducing content;
processing an evaluation value for specifying a notable scene in the content, based on characteristic data included in one of video data and audio data of the content, and for detecting a predetermined scene in the content;
judging whether or not the notable scene in the content has been detected, based on the operated evaluation value; and
controlling, in response to the judgment of detection of the notable scene in the content, to display a related image with a predetermined size based on an image of the notable scene thus detected, wherein
the related image is obtained by generating a still image from a video picture reproduced at a previously designated time point, the video picture being included in the video data of a predetermined period of time to be reproduced previously to the notable scene.

* * * * *